United States Patent
Hannon et al.

(10) Patent No.: US 11,604,443 B2
(45) Date of Patent: Mar. 14, 2023

(54) SYSTEM AND METHOD FOR DISTRIBUTED DEVICE CONFIGURATION AND AUTHORIZATION

(71) Applicant: Johnson Controls Technology Company, Auburn Hills, MI (US)

(72) Inventors: Jeremy P. Hannon, Milwaukee, WI (US); Nicholas J. Schaf, Hartland, WI (US); Leyla Mousavi, Milwaukee, WI (US); Scott G. Ambelang, Milwaukee, WI (US); Xin Zhang, Hartland, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/543,452

(22) Filed: Aug. 16, 2019

(65) Prior Publication Data
US 2020/0064797 A1    Feb. 27, 2020

Related U.S. Application Data

(60) Provisional application No. 62/722,064, filed on Aug. 23, 2018.

(51) Int. Cl.
*G05B 19/042* (2006.01)
*G06F 8/65* (2018.01)
*H04L 67/00* (2022.01)
*H04L 67/10* (2022.01)
*H04L 9/40* (2022.01)

(52) U.S. Cl.
CPC ............ *G05B 19/042* (2013.01); *G06F 8/65* (2013.01); *H04L 63/101* (2013.01); *H04L 67/10* (2013.01); *H04L 67/34* (2013.01); *G05B 2219/25011* (2013.01)

(58) Field of Classification Search
CPC ....... H04L 63/101; H04L 67/10; H04L 67/34; H04L 63/104; G05B 19/042; G06F 8/65
USPC ........................................................ 709/220
See application file for complete search history.

(56) References Cited

U.S. PATENT DOCUMENTS

| | | |
|---|---|---|
| 2010/0076605 A1 | 3/2010 | Harrod et al. |
| 2010/0280636 A1 | 11/2010 | Holland et al. |
| 2014/0241354 A1* | 8/2014 | Shuman ................ H04L 12/281 370/390 |

(Continued)

OTHER PUBLICATIONS

U.S. Appl. No. 16/198,484, filed Nov. 21, 2018, Johnson Controls Technology Company.

(Continued)

*Primary Examiner* — David R Lazaro
*Assistant Examiner* — Zia Khurshid
(74) *Attorney, Agent, or Firm* — Foley & Lardner LLP

(57) ABSTRACT

A system for distributed device management includes a group of devices. Each device in the group of devices communicate with one or more other devices in the group of devices over one or more network channels, and each device in the group of devices includes a processing circuit. The processing circuit of each device in the group of devices manages one or more devices in the group of devices, authorizes a new device to join the group of devices, and synchronizes data with the new device and with one or more devices in the group of devices over the one or more network channels.

23 Claims, 15 Drawing Sheets

(56) References Cited

U.S. PATENT DOCUMENTS

| | | | |
|---|---|---|---|
| 2015/0029880 A1* | 1/2015 | Burns | G01S 11/16 370/252 |
| 2016/0036819 A1* | 2/2016 | Zehavi | H04W 4/70 726/4 |
| 2016/0349999 A1* | 12/2016 | Adler | G06F 3/0604 |
| 2017/0284691 A1 | 10/2017 | Sinha et al. | |
| 2017/0357607 A1 | 12/2017 | Cayemberg et al. | |
| 2018/0275625 A1 | 9/2018 | Park et al. | |
| 2018/0316513 A1 | 11/2018 | Gamroth et al. | |
| 2018/0317095 A1 | 11/2018 | Rumler et al. | |
| 2019/0042278 A1* | 2/2019 | Pirvu | G06F 9/4411 |
| 2019/0108013 A1 | 4/2019 | Duraisingh et al. | |

OTHER PUBLICATIONS

U.S. Appl. No. 16/246,080, filed Jan. 11, 2019, Gamroth et al.
U.S. Appl. No. 16/246,396, filed Jan. 11, 2019, Drury et al.
U.S. Appl. No. 16/296,004, filed Mar. 7, 2019, Hoglund et al.
U.S. Appl. No. 16/408,657, filed May 10, 2019, Hobgood et al.

* cited by examiner

SYSTEM AND METHOD FOR DISTRIBUTED DEVICE CONFIGURATION AND AUTHORIZATION

CROSS REFERENCE TO RELATED APPLICATION

This application claims the benefit of and priority to U.S. Provisional Patent Application No. 62/722,064, filed on Aug. 23, 2018, the entire disclosure of which is incorporated by reference herein.

BACKGROUND

The present disclosure relates generally to building management systems. The present disclosure relates more particularly to systems and methods for distributed device configuration and authorization in a building management system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, one or more other systems that are capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, Internet of Things (IoT) devices, and/or the like) configured to facilitate monitoring and controlling of the environment.

Typically, the configuration of a group of devices and the authorization of other devices to join the group is centralized on one primary device or server. In some cases, there may be one or more redundant devices or servers as a contingency for failure of the primary device or server. For example, some solutions either designate a primary device or rely on an extra device or server. However, in these solutions, the primary device can become a single point of failure, in that it is the sole device by which the user can administer the group. Thus, if the primary device fails, the group may not be configurable by the user, additional devices may not be added to the group, and/or the group may not even function properly.

In some cases, while extra devices or servers as a redundancy for the primary device can help in the event of failure of the primary device, the extra devices or servers add additional costs. In addition, in the case of a network, the group is generally required to connect to an outside network and/or Internet to access a Cloud service. Further, the extra devices or servers require additional design and manufacturing effort and can increase sales and distribution complexity.

Accordingly, a solution that removes the single point of failure without the need of having additional redundant devices or servers is desired.

SUMMARY

According to an example embodiment, a system for distributed device management includes: a group of devices, each device in the group of devices configured to communicate with one or more other devices in the group of devices over one or more network channels, and each device in the group of devices including a processing circuit configured to: manage one or more devices in the group of devices; authorize a new device to join the group of devices; and synchronize data with the new device and with one or more devices in the group of devices over the one or more network channels.

In some embodiments, each device in the group of devices may include one or more data stores configured to store configuration data for one or more devices in the group of devices.

In some embodiments, the one or more data stores of each device in the group of devices may be further configured to store an authorized device list for the group of devices.

In some embodiments, the one or more data stores of each device in the group of devices may be further configured to store diagnostic data for one or more devices in the group of devices.

In some embodiments, each device in the group of devices may be configured to: detect a software or firmware version of one or more devices in the group of devices stored in the one or more data stores; and transmit a command to the one or more devices to automatically update to a different firmware or software version in response to detecting an outdated version of the firmware or software.

In some embodiments, each device in the group of devices may include a user interface configured to enable a user to manage the group of devices from any device in the group of devices.

In some embodiments, each device in the group of devices may be configured to monitor one or more devices in the group of devices.

In some embodiments, each device in the group of devices may be configured to monitor a connection status of the one or more devices in the group of devices.

In some embodiments, each device in the group of devices may be configured to monitor a health status of the one or more devices in the group of devices.

In some embodiments, each device in the group of devices may be configured to reset the one or more devices in the group of devices in response to detecting an error state of the one or more devices.

According to another example embodiment, A system for distributed device management includes: a group of devices, each device in the group of devices configured to communicate with one or more other devices in the group of devices over one or more network channels, and each device in the group of devices including a processing circuit configured to: synchronize data with one or more devices in the group of devices over the one or more network channels, wherein each device in the group of devices further includes one or more data stores configured to store configuration data for one or more devices in the group of devices.

In some embodiments, the one or more data stores of each device in the group of devices may be further configured to store an authorized device list for the group of devices.

In some embodiments, each device in the group of devices may include a user interface configured to enable a user to manage the group of devices from any device in the group of devices.

In some embodiments, each device in the group of devices may be configured to monitor one or more devices in the group of devices.

In some embodiments, each device in the group of devices may be configured to monitor a connection status of the one or more devices in the group of devices.

In some embodiments, each device in the group of devices may be configured to monitor a health status of the one or more devices in the group of devices.

In some embodiments, each device in the group of devices may be configured to reset the one or more devices in the group of devices in response to detecting an error state of the one or more devices.

According to another example embodiment, a building management system includes: at least two network channels; a first device communicably coupled to the at least two network channels; and a second device communicably coupled to the at least two network channels, each of the first and second devices including: a first network interface configured to communicate first packets for a first network channel from among the at least two network channels; and a second network interface configured to communicate second packets for a second network channel from among the at least two network channels. Each of the first and second devices are configured to tag the first packets with a corresponding identifier of the first network channel, and to tag the second packets with a corresponding identifier of the second network channel.

In some embodiments, the building management system may further include an interconnect connecting the first device to the second device; each of the first and second devices may further include an interconnect interface configured to transmit the tagged packets over the interconnect; and each of the first and second devices may be configured to: receive a packet via the interconnect interface; extract the corresponding identifier from the packet; and forward the packet to a corresponding one of the first or second network interface according to the identifier extracted from the packet.

In some embodiments, the first network channel may be a first virtual local area network (VLAN) channel and the second network channel may be a second VLAN channel different from the first VLAN channel.

According to another example embodiments, a system for distributed device management includes: a group of devices, each device in the group of devices configured to communicate with one or more other devices in the group of devices over one or more network channels, and each device in the group of devices including a processing circuit configured to: monitor one or more devices in the group of devices; detect a failing device from among the one or more devices in the group of devices; and at least one of: reset itself in response to detecting that it is the failing device; or cause another device to reset in response to detecting that the other device is the failing device.

In some embodiments, each device in the group of devices may be configured to monitor a connection status of one or more devices in the group of devices.

In some embodiments, each device in the group of devices may be configured to monitor a health status of one or more devices in the group of devices.

In some embodiments, each device in the group of devices may be configured to: detect a software or firmware version of one or more other devices in the group of devices; and transmit a command to the one or more other devices to automatically update to a different firmware or software version in response to detecting an outdated version of the firmware or software.

In some embodiments, to cause the other device to reset, the processing circuit may be configured to: transmit a command to the other device to perform a self-factory reset, and in response to receiving the command, the other device may be configured to at least one of: install an original factory image from its own hardware; retrieve a factory image from a cloud service; or communicate with another device from among the group of devices to download a factory image.

In some embodiments, to cause the other device to reset, the processing circuit may be configured to: upload a factory image to the other device, and the other device may be configured to install the uploaded factory image.

DETAILED DESCRIPTION

Figure 1:
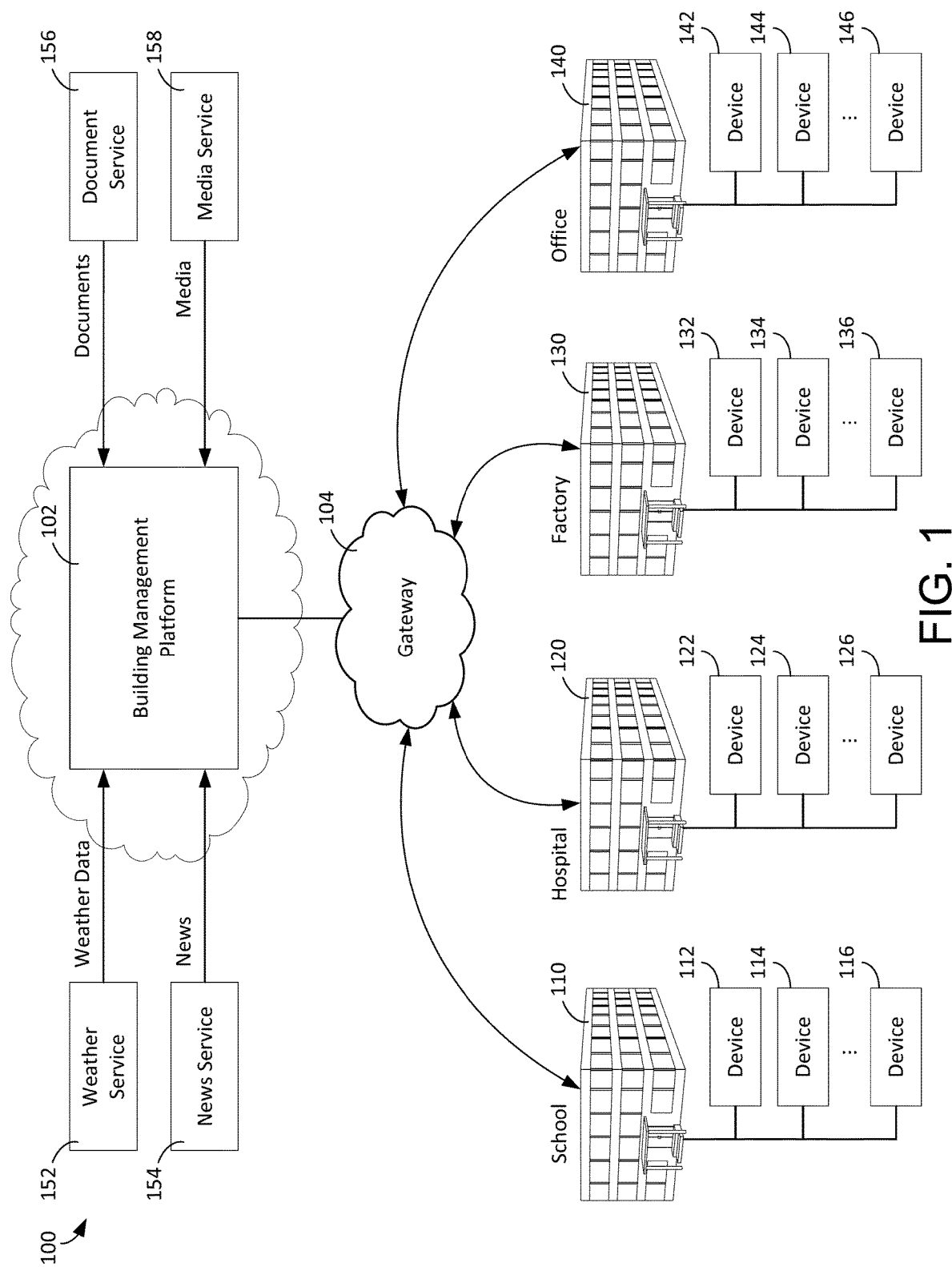
FIG. 1 is a block diagram of a smart building environment, according to some embodiments.

FIG. 1 is a block diagram of a smart building environment 100, according to some exemplary embodiments. Smart building environment 100 is shown to include a building management platform 102. The building management platform 102 can be configured to collect data from a variety of different data sources. For example, the building management platform 102 is shown collecting data from buildings 110, 120, 130, and 140. For example, the buildings may include a school 110, a hospital 120, a factory 130, an office building 140, and/or the like. However, the present disclosure is not limited to the number or types of buildings 110, 120, 130, and 140 shown in FIG. 1. For example, in some embodiments, the building management platform 102 may be configured to collect data from one or more buildings, and the one or more buildings may be the same type of building or may include one or more different types of buildings than that shown in FIG. 1.

Building management platform 102 can be configured to collect data from a variety of devices 112-116, 122-126, 132-136, and 142-146, either directly (e.g., via a communications network) or indirectly (e.g., via one or more gateways 104). In some embodiments, devices 112-116, 122-126, 132-136, and 142-146 are BMS devices, building subsystems, and/or internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio meters, AFR sensors, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, LIDAR sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, CMOS sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158. In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. building management platform 102 can collect data directly from external systems or devices or via a network 106 (e.g., a WAN, the Internet, a cellular network, etc.). In some embodiments, building management platform 102 can process and transform collected data to generate timeseries data. Several features of building management platform 102 are described in more detail below.

Building Management System

Figure 2:
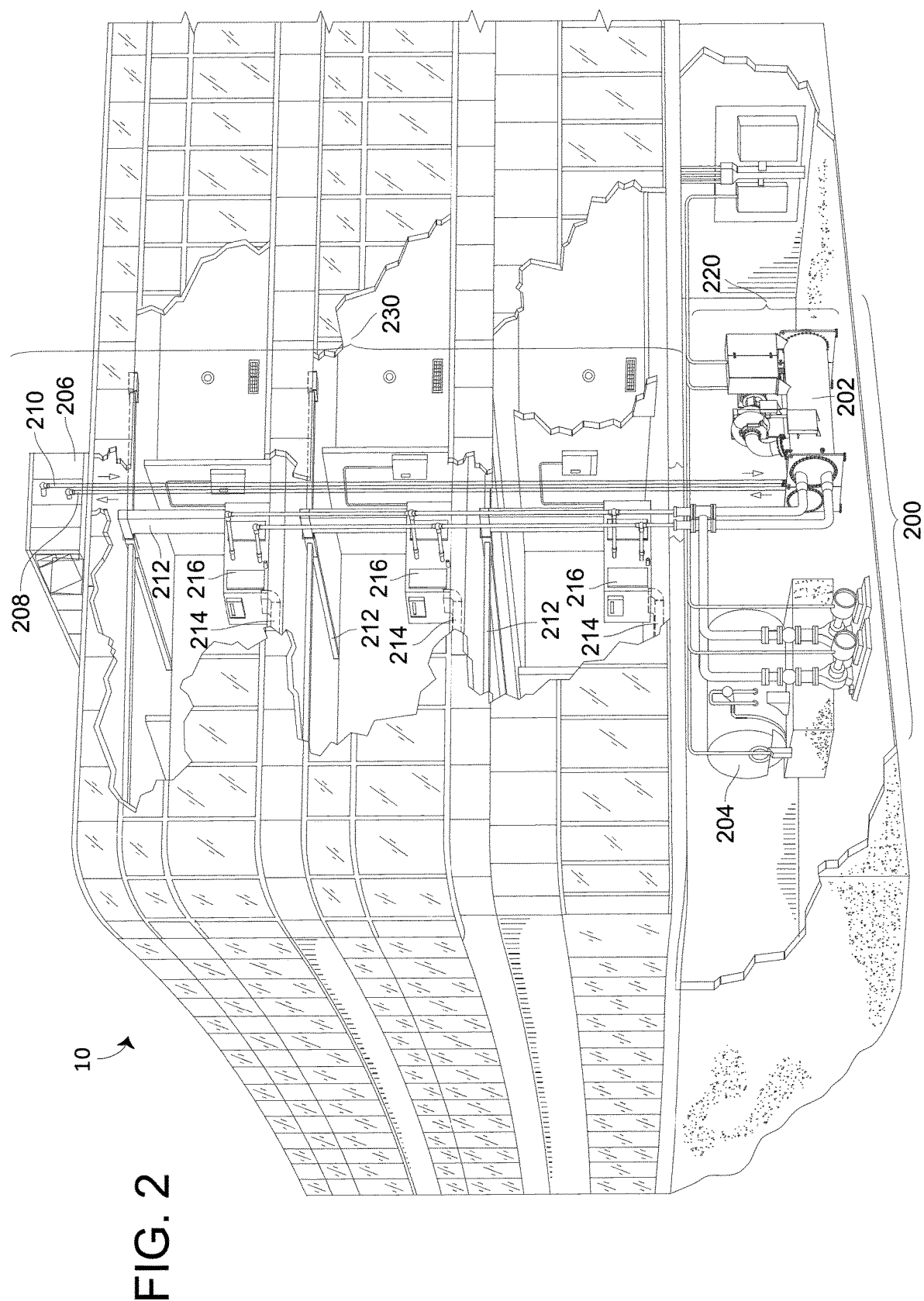
FIG. 2 is a diagram of a building equipped with a building management system (BMS) and a HVAC system, according to some embodiments.
Figure 3:
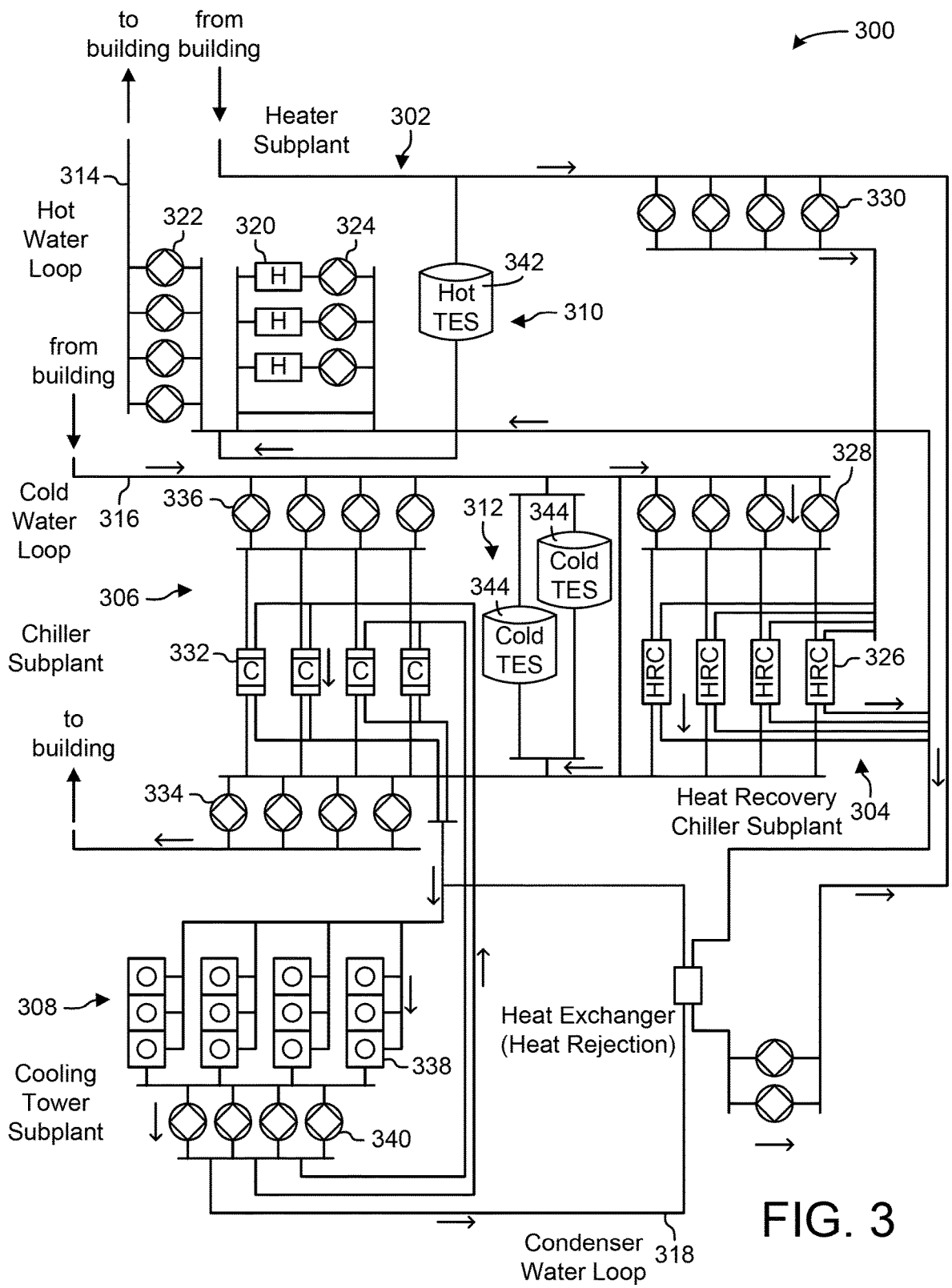
FIG. 3 is a schematic of a waterside system which can be used as part of the HVAC system of FIG. 2, according to some embodiments.
Figure 4:
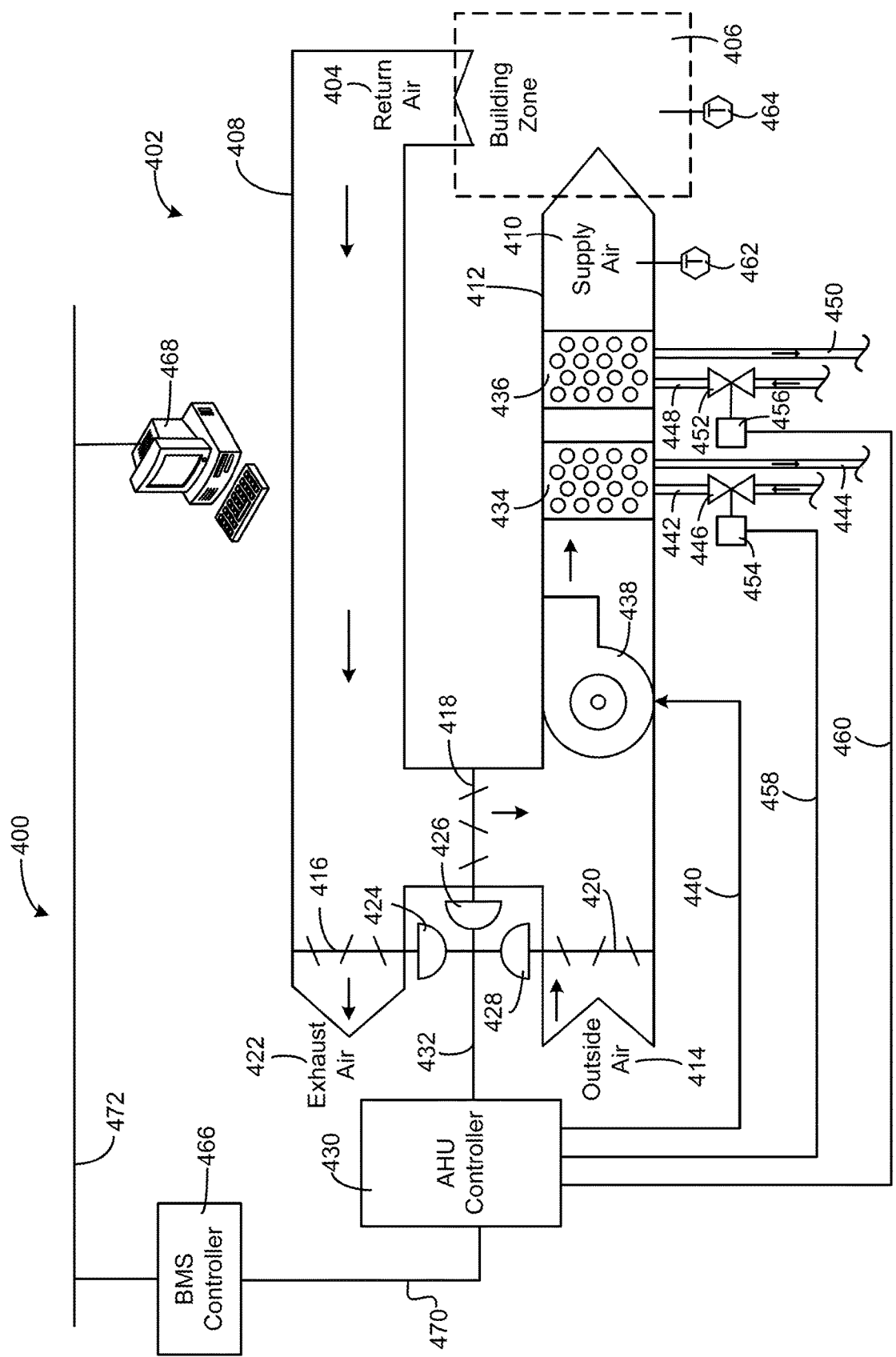
FIG. 4 is a block diagram of an airside system which can be used as part of the HVAC system of FIG. 2, according to some embodiments.
Figure 5:
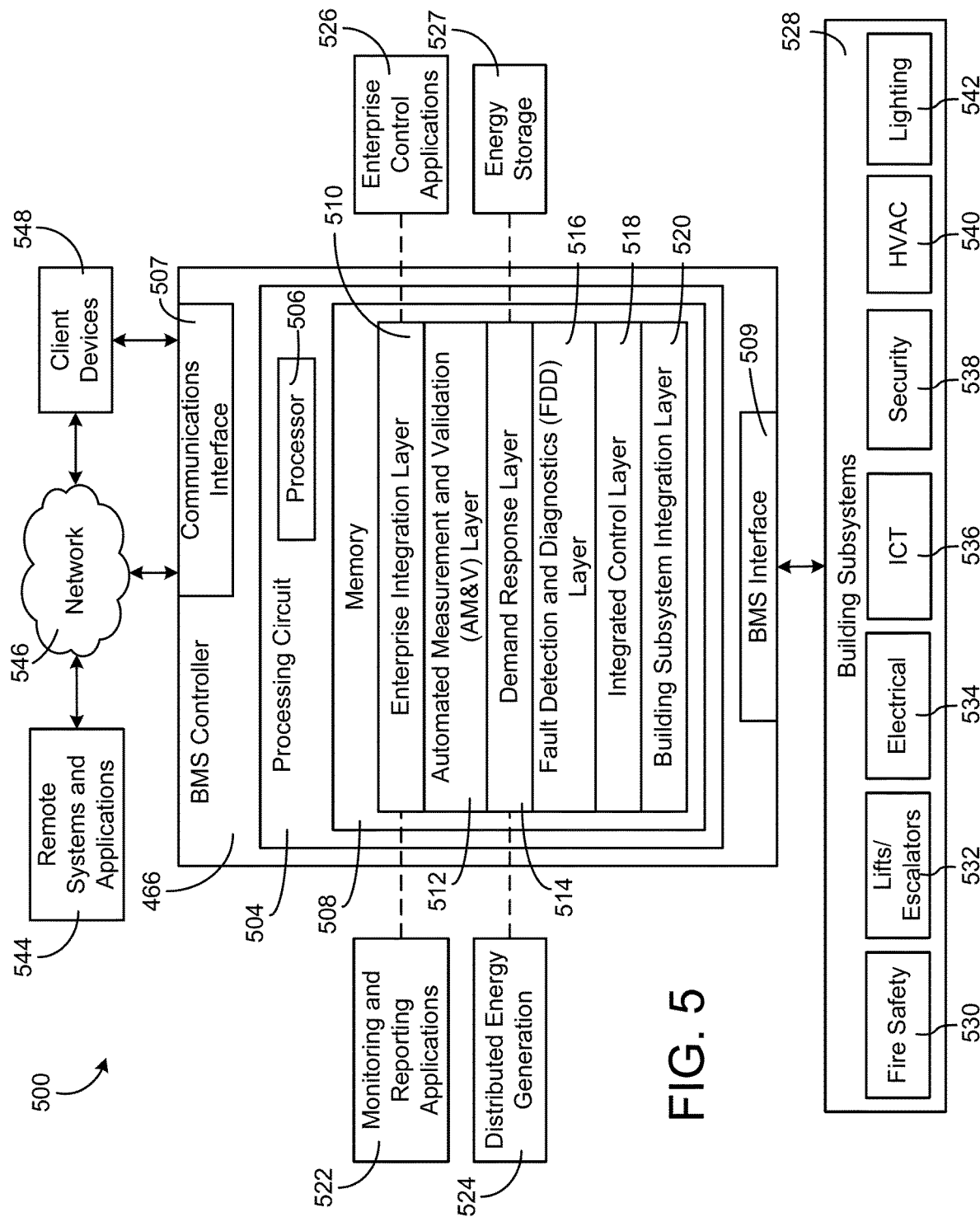
FIG. 5 is a block diagram of a BMS which can be used in the building of FIG. 2, according to some exemplary embodiments.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 110, 120, 130, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Further, each of the systems may include a plurality of sensors and other devices (e.g., IoT devices) for the proper operation, maintenance, monitoring, and the like of the respective systems.

The BMS that serves building 10 includes a HVAC system 200. HVAC system 200 can include a plurality of HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and a plurality of building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine optimal control actions for building subsystems 528 based on the inputs, generate control signals based on the optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across a plurality of multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine a set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated supersystem. In some embodiments, integrated control layer 518 includes control logic that uses inputs and outputs from a plurality of building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Distributed Device Configuration and Authorization

Figure 6:
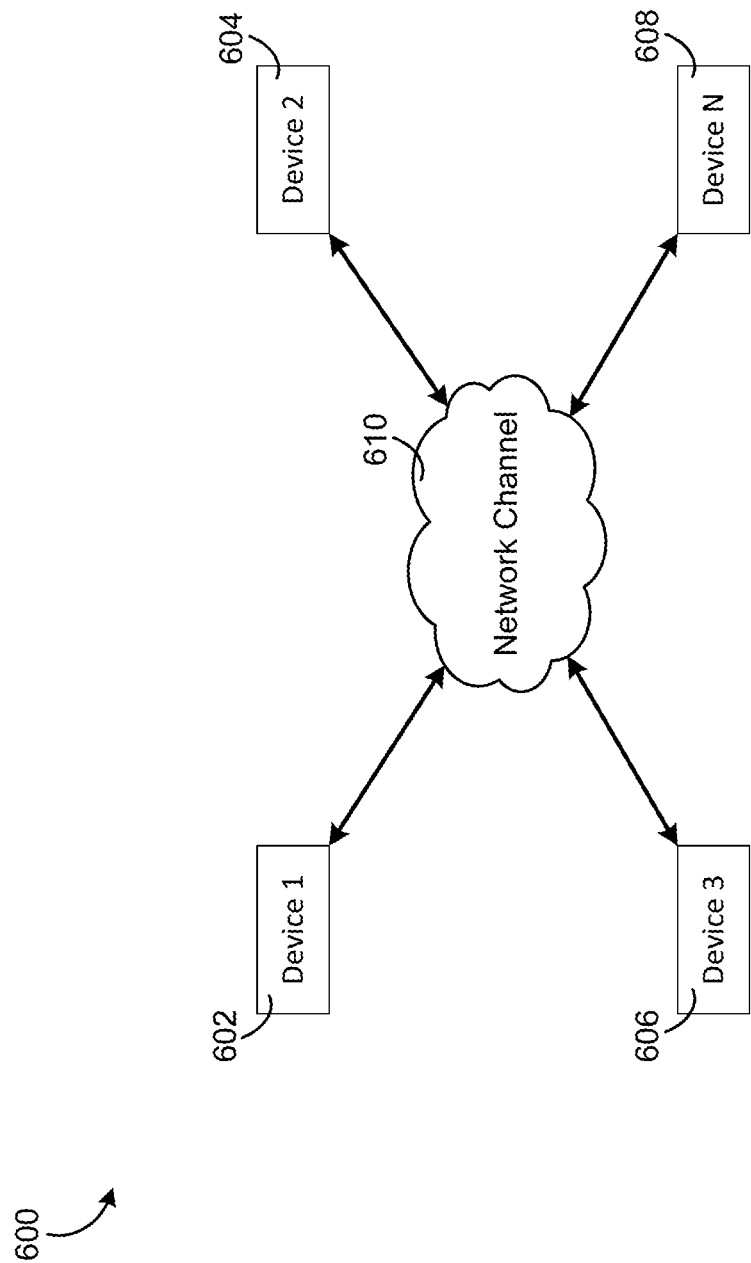
FIG. 6 is a block diagram illustrating a network of devices, according to some embodiments.

Referring now to FIG. 6, a network of devices 600 is shown, according to some exemplary embodiments. In some embodiments, the network of devices 600 includes a plurality of N devices, including a first device 602, a second device 604, a third device 606, and an Nth device 608, where N is a natural number greater than 1. It should be appreciated that the present disclosure is not limited to the number of devices shown in FIG. 6, and that the network of devices 600 can include any suitable number of at least two devices. In some embodiments, the devices 602, 604, 606, and 608 in the network of devices 600 may be gateway devices (e.g., the gateway 104 in FIG. 1), access point devices, modems, routers, or any suitable wireless mesh network devices. However, the present disclosure is not limited thereto, and in other embodiments, the devices 602, 604, 606, and 608 can be BMS devices or other building equipment or devices (e.g., intelligent light fixtures, VAV units, or the like), IoT devices, a swarm of robots, or the like.

Each of the devices 602, 604, 606, and 608 can be configured to communicate with each other over any suitable communication medium, such as an available network channel 610. In some embodiments, each of the devices can exchange messages via the network channel 610. For example, in some embodiments, each of the devices 602, 604, 606, and 608 may include an agent to communicate via messages over the network channel 610. An example of a BMS with dynamic channel communications is described in detail in U.S. patent application Ser. No. 15/934,593, filed Mar. 23, 2018, the entire content of which is incorporated by reference herein. However, the present disclosure is not limited thereto, and in other embodiments, the devices 602, 604, 606, and 608 are configured to communicate with each other over any suitable communication medium with or without a corresponding agent.

In some embodiments, the devices 602, 604, 606, and 608 do not require an external network and/or an Internet connection in order to communicate with each other via network channel 610. However, the present disclosure is not limited thereto, and in other embodiments, the devices 602, 604, 606, and 608 may communicate over the network channel 610 via an external network and/or Internet connection. In various embodiments, the network channel 610 can include any suitable communications link or network (e.g., a local area network (LAN), wide area network (WAN), wireless local area network (WLAN), or the like) and/or can be based on Ethernet, WiFi, WiMax, Bluetooth, or the like.

In various embodiments, each of the devices 602, 604, 606, and 608 may be configured to manage configuration and authorization of devices in a device group, so that the configuration and authorization of devices are redundant across each device in the device group. For example, assuming that each of the devices 602, 604, 606, and 608 are authorized devices in the same device group, no single device is in control, so that failure of one or more devices from among the group of devices in the device group does not prevent the ability to manage the remaining devices in the device group or to authorize new or replacement devices to join the device group. For example, in various embodiments, a user or operator can log into any of the devices 602, 604, 606, and 608 to manage the device group (e.g., change configuration, add devices, and/or the like), which can be especially useful for managing a group of devices in a multi-hop wireless network having high latency. Accordingly, an extra device or server for redundancy purposes in case of a failure is not needed, since each of the devices 602, 604, 606, and 608 are functionally equivalent. The configuration of each of the devices 602, 604, 606, and 608 will be described in more detail with reference to FIG. 7.

While FIG. 6 shows one network channel 610, the present disclosure is not limited thereto, and in some embodiments, each of the devices 602, 604, 606, and 608 may be configured to communicate over one or more network channels. For example, in some embodiments, each of the devices 602, 604, 606, and 608 that are authorized devices in the same device group may communicate configuration and authorization data for the devices in the device group over one or more first network channels, and may communicate general network data with other devices (e.g., devices outside of the device group or other devices within the device group) over one or more second network channels. Accordingly, communications associated with the configuration and authorization of devices in the device group may be isolated from communications associated with general network data.

Figure 7:
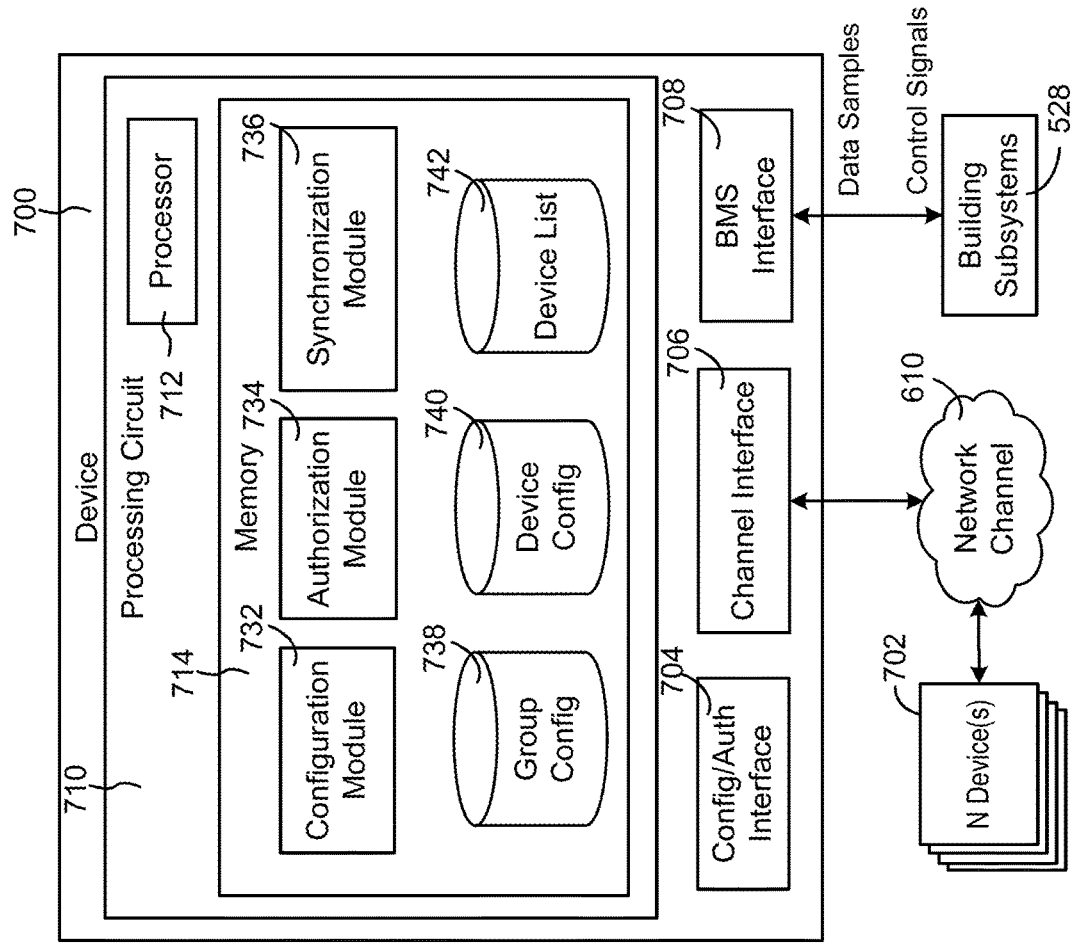
FIG. 7 is a block diagram illustrating one of the devices of FIG. 6 in greater detail, according to some embodiments.

Referring to FIG. 7 a block diagram illustrating an example of a device from FIG. 6 is shown, according to an exemplary embodiment. In some embodiments, each of the devices 602, 604, 606, and 608 may include the same or substantially the same components and elements as those of the device 700 shown in FIG. 7. As shown in FIG. 7, in some embodiments, the device 700 and each of the N devices 702 are in a same device group, and each of the devices 700 and 702 is configured to manage the device group and/or authorize additional devices (e.g., new or replacement devices) to join the device group. In some embodiments, the devices 700 and 702 are configured to communicate with each other via one or more network channels 610 as described with reference to FIG. 6, and to synchronize configuration and device data with each other. In various embodiments, the devices 700 and 702 may be gateway devices (e.g., the gateway 104), access point devices, modems, routers, or any suitable wireless mesh network devices. In other embodiments, the devices 700 and 702 can be IoT devices, BMS devices, or other building equipment or devices, for example, such as intelligent light fixtures, VAV units, robots, or the like.

As shown in FIG. 7, in some embodiments, the device 700 (and each of the N devices 702) includes a configuration and authorization (config/auth) interface 704, a channel interface 706, and a BMS interface 708. Each of the interfaces 704, 706, and 708 can include wired or wireless communications interfaces (e.g., jacks, antennas, transmitters, receivers, transceivers, wire terminals, etc.) for conducting data communications with a user, the devices 700 and 702 in the device group, the building subsystems 528, and/or other external systems or devices. Communications conducted via interfaces 704, 706, and 708 can be direct (e.g., local wired or wireless communications), via network channel 610, or via a communications network 546 (e.g., a WAN, the Internet, a cellular network, etc.).

In some embodiments, the config/auth interface 704 is configured to provide access to the device 700 by a user. In some embodiments, config/auth interface 704 provides a user interface for a user to log into the device 700. For example, in some embodiments, the config/auth interface 704 presents a set of web pages to a user device served from a local web server to allow access (e.g., remote access) to the device 700 by a user operating the user device. In another example, the device 700 may have an application stored thereon that can allow the user to interact with the device 700 via a display device and an input device associated with the device 700. In some embodiments, the user can log into the device 700 via the config/auth interface 704 to configure settings for the device 700 or the device group, and to authorize other devices to join the device group. For example, in some embodiments, the config/auth interface 704 provides a search or scan function on the user interface to allow the user to identify devices (e.g., via unique device identifiers) to add to the device group.

In some embodiments, the channel interface 706 facilitates communications between the device 700 and other devices (e.g., the N devices 702) in the device group via the one or more network channels 610. In some embodiments, the channel interface 706 transmits and receives messages and data (e.g., configuration and device data) via the one or more network channels 610. In this case, each of the devices 700 and 702 can receive the configuration and device data from other ones of the devices 700 and 702 via the one or more network channels 610 through their respective channel interface 706, and can synchronize the data amongst themselves. In some embodiments, channel interface 706 transmits an announce message to the one or more network channels 610 when the device 700 is powered on or otherwise becomes available. In some embodiments, the other devices (e.g., N devices 702) can discovers the available device when the announcement is received over the one or more network channels 610.

In some embodiments, the BMS interface 708 may be the same as or similar to the BMS interface 509 described with reference to FIG. 5. In some embodiments, the BMS interface 708 can facilitate communications between the device 700 and other devices and systems within the BMS. For example, if the device 700 is a gateway device, the BMS interface 708 can facilitate communications between the building subsystems 528 and a BMS controller (e.g., the BMS controller 466 shown in FIG. 5). In this case, in some embodiments, device 700 receives data samples from building subsystems 528 and transmits the data samples to the BMS controller 466 via the BMS interface 708. Similarly, in some embodiments, device 700 receives control signals from the BMS controller 466 and provides the control signals to the building subsystems 528 via BMS interface 708. However, the present disclosure is not limited thereto, and in other embodiments, the BMS interface 708 may be variously modified or omitted depending on the type of the device 700.

Still referring to FIG. 7, in some embodiments, the device 700 (and each of the N devices 702) includes one or more processing circuits 710 including one or more processors 712 and memory 714. Each of the processors 712 can be a general purpose or specific purpose processor, an application specific integrated circuit (ASIC), one or more field programmable gate arrays (FPGAs), a group of processing components, or other suitable processing components. Each of the processors 712 can be integrated within a single device or distributed across multiple separate systems or devices. For example, each of the processors 712 may be an internal processor with respect to device 700 or may be an external processor as part of a separate device. Each of the processors 712 is configured to execute computer code or instructions stored in memory or received from other computer readable media (e.g., CDROM, network storage, a remote server, etc.).

Memory 714 can include one or more devices (e.g., memory units, memory devices, storage devices, etc.) for storing data and/or computer code for performing and/or facilitating the various processes described in the present disclosure. Memory 714 can include random access memory (RAM), read-only memory (ROM), hard drive storage, temporary storage, non-volatile memory, flash memory, optical memory, or any other suitable memory for storing software objects and/or computer instructions. Memory 714 can include database components, object code components, script components, or any other type of information structure for supporting the various activities and information structures described in the present disclosure. Memory 714 can be communicably connected to the processors 712 via the processing circuits 710 and can include computer code for executing (e.g., by processor 712) one or more processes described herein.

In some embodiments, memory 714 includes a configuration module 732, an authorization module 734, a synchronization module 736, a group config data store 738 (e.g., a database or storage device), a device config data store 740, and a device list data store 742. While the group config data store 738, the device config data store 740, and the device list data store 742 is shown in FIG. 7 as being part of the memory 714, the present disclosure is not limited thereto, and in various embodiments, each of the group config data store 738, the device config data store 740, and the device list data store 742 may be internal storage or external storage. For example, each of the group config data store 738, the device config data store 740, and the device list data store 742 may be internal storage with relation to device 700, and/or may be external storage (e.g., flash memory and/or the like). Further, each of the group config data store 738, the device config data store 740, and the device list data store 742 may be the same or separate data stores (e.g., a part of the same database/storage device or a part of separate databases/storage devices).

In some embodiments, the configuration module 732 applies configuration settings or parameters to the device 700. For example, in some embodiments, when a user accesses the device 700 (or any of the N devices 702) via the config/auth interface 704, the user can configure necessary or desired settings or parameters for the device 700 and/or the device group. In another example, in some embodiments, the configuration module 732 can receive device and/or device group configuration settings or parameters from one or more other devices (e.g., the N devices 702) in the device group via the channel interface 706. In some embodiments, when the configuration module 732 receives configuration settings or parameters (e.g., via the user or via one or more of the other N devices 702), the configuration module 732 applies the configuration settings or parameters to the device 700. For example, in some embodiments, the configuration module 732 updates the configuration settings or parameters for the device 700, stores configuration settings or parameters for the device group in the group config data store 738, and stores configuration settings or parameters for the device 700 and/or one or more of the N devices 702 in the device config data store 740.

In various embodiments, the configuration settings or parameters may vary depending on the device type. For example, for a wireless mesh network where each device in the device group is a wireless mesh repeater and the device group as a whole forms the mesh network, some configuration settings or parameters can include, for example, network parameters, bridged interfaces, and/or the like. In another example, for a swarm of robots configured to work together to complete a task where each device in the device group is a robot, some configuration settings or parameters can include, for example, task parameters, operating parameters, and/or the like. In still another example, for a group of intelligent light fixtures where each device in the device group is a single light fixture, some configurations settings or parameters can include, for example, light brightness level, ramp rate, lighting schedule, and/or the like. However, the present disclosure is not limited to the non-limiting examples described above, and it should be appreciated that the configuration settings or parameters can include any suitable settings or parameters that are used for the operation of the devices in the device group depending on the device type.

In some embodiments, the authorization module 734 manages the authorization of one or more devices to a device group. For example, in some embodiments, when the user accesses the device 700 (or any of the N devices 702) via the config/auth interface 704, the user can authorize other devices to join the device group. In this case, for example, the user can input (via voice, text, and/or the like) or otherwise specify a unique device identifier for a specific device to add to the device group, or the authorization module 734 can scan for devices (e.g., via their unique device identifiers) to add to the group. In some embodiments, the authorization module 734 can provide a list of devices resulting from the scan to the user via the config/auth interface 704, and the user can select one or more devices to add to the group of devices. When a device is authorized or added to the device group, the authorization module 734 updates or otherwise stores an authorized device list in the device list data store 742.

In some embodiments, authorization module 734 receives an announcement from a device when the device is powered on or otherwise becomes available. In this case, authorization module 734 checks to see if the device has been previously authorized. For example, in some embodiments, the authorization module 734 checks to see if a new device associated with an announcement is included in the authorized device list stored in the device list data store 742. If the new device is already authorized, the device 700 (or any of the other N device 702) shares the configuration settings or parameters for the device group with the new device via any suitable channel or communication medium (e.g., the one or more network channels 610). In some embodiments, if the new device is not configured or authorized for the device group, the authorization module 734 updates or otherwise adds the new device (e.g., the unique identifier associated with the new device) to an unauthorized device list, which may be stored in the device list data store 742 or any suitable data storage. In this case, when the user accesses the device 700 (or any of the N devices 702) via the config/auth interface 704, the user may be presented the unauthorized device list to select one or more devices to add to the device group. Once the new device is authorized (e.g., pre-authorized or selected from the unauthorized device list), the device 700 (or any of the N devices 702) shares the configuration settings or parameters with the new device, and the new device applies the configuration settings or parameters, joins the device group, and begins to communicate with the other members of the device group via one of the available communication channels (e.g., the network channel 610).

In some embodiments, for larger device groups where the list of devices (e.g., authorized device list or unauthorized device list) may be very large, it may be difficult or tedious for the user to identify the devices that the user wants to update. In this case, the authorization module 734 may provide multiple ways for the user to filter or reorder the device lists (e.g., the authorized device list and/or the unauthorized device list), such as by proximity, software version, hardware version, device capability, device identifier, and/or the like. In some embodiments, if a user is holding or looking at a new device that they want to add to a device group, the user can log into a member device of the device group that is nearest or closest to the new device and filter the list of devices (authorized or unauthorized) by proximity to quickly identify the new device. For example, for a wireless network, the member device that the user is logged into can determine which devices (authorized or unauthorized) are within radio range, and therefore, are closest to the user.

In some embodiments, the synchronization module 736 synchronizes the configuration settings or parameters (e.g., the device group's and/or device's configuration settings or parameters) and the list of authorized devices with the other member devices (e.g., the N devices 702) of the device group. In some embodiments, the synchronization module 736 also synchronizes the list of unauthorized devices with the other member devices (e.g., the N devices 702) of the device group. For example, in some embodiments, the synchronization module 736 may synchronize with the other member devices whenever a change is made to the configuration, list of devices (e.g., authorized device list and/or unauthorized device list), and/or the like on any of the member devices 700 and 702. In some embodiments, the synchronization module 736 may synchronize with the other member devices periodically (e.g., for each predetermined time interval). In some embodiments, the synchronization module 736 may synchronize with the other member devices periodically as well as whenever a change is made on any of the member devices 700 and 702.

In some embodiments, the synchronization module 736 may propagate the entire configuration settings and device lists to the other member devices (e.g., the N devices 702) for each synchronization event. However, in this case, if multiple users configure different settings for different devices in the device group concurrently (e.g., simultaneously or at the same time), changes made by the second user may not be accepted since the base set may be out of date, or the changes by the second user may override the changes by the first user with the out of date base set. Accordingly, in other embodiments, the synchronization module 736 may propagate only a change of the configuration settings and/or device lists as differences (e.g., deltas) between the previous configuration settings and/or device lists and the changed configuration settings and/or device list. In this case, changes by multiple users may both be accepted. For example, if the first user changes settings A and B, and the second user changes settings C and D, then the changes (or deltas) by the first and second users do not conflict, and thus, can be applied by all member devices in the device group.

In some embodiments, if the member devices of the device group are battery powered devices that may transition into a sleep mode, at least one of the member devices may be configured as an always-on device, or the member devices may cycle from sleep mode to on mode such that at least one of the member devices are on at any given time. In this case, the member device that is on may be configured as a "proxy" for the sleeping devices by transmitting (or broadcasting) the sleeping device's data when it wakes up. In some embodiments, the "proxy" device can also respond to outside requests for sleeping device data updates or store messages for the sleeping device until the sleeping device wakes up. Typically, a single "parent" device is designated for the sleeping device, but if the RF environment changes (e.g., the device moves or the wireless signal is blocked) then the sleeping device may not be able to locate its "parent" device and must take time to search for and establish another "parent" device. In this case, the sleeping device may miss any messages that were being held while waiting for it unless it waits for a multi-hop message to retrieve the data from its previous "parent" device. Either case may result in additional waiting time and battery drain for the sleeping device. In some embodiments, the sleeping devices propagate messages to all always-on devices in the network, so that it can wake up, transmit to any always-on device within radio range, and go back to sleep without having to wait for the messages to propagate over multiple radio hops.

Figure 8:
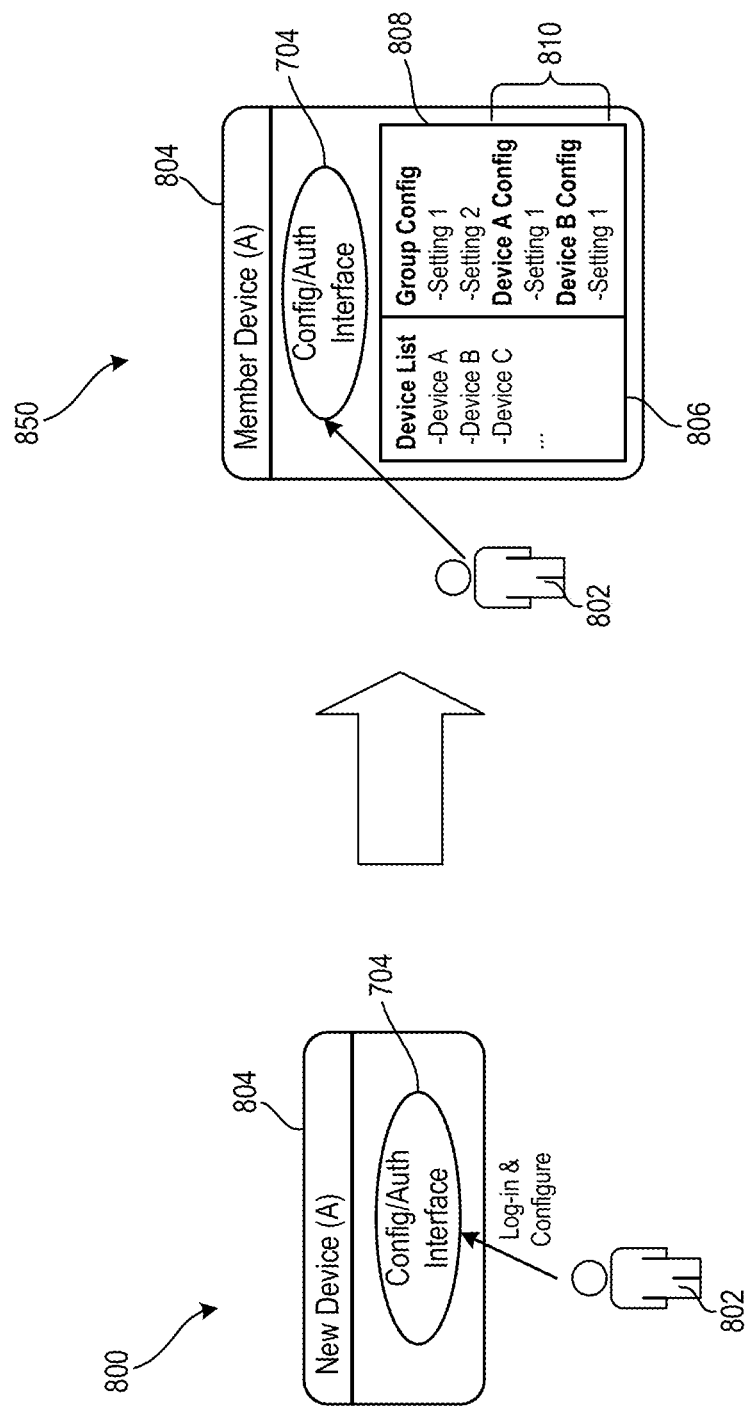
FIG. 8 is a flow diagram for configuring a device group from a device, according to some embodiments.

Referring now to FIG. 8, a flow diagram for configuring a device group from a device 804 is shown, according to an exemplary embodiment. As shown on the left side 800 of FIG. 8, a user 802 logs into the configuration interface 704 of a first device (device A) 804 to create a device group. The user 802 configures necessary or desired configuration settings or parameters 810 for the device group 808 and the first device 804 via the config/auth interface 704, and the first device 804 to which they've connected is automatically added to the device group. The first device 804 is now configured and is a member of the device group as shown on the right side 850 of FIG. 8. Further, as shown on the right side 850 of FIG. 8, the user adds other devices (e.g., Device B, Device C, and the like) to the device group via the config/auth interface 704, and the other devices are added to the device list 806 (e.g., via authorization module 734). In some embodiments, the first device 804 also stores configuration settings or parameters 810 of other devices (e.g., Device B) so that they can be adjusted from any device in the device group.

Figure 9:
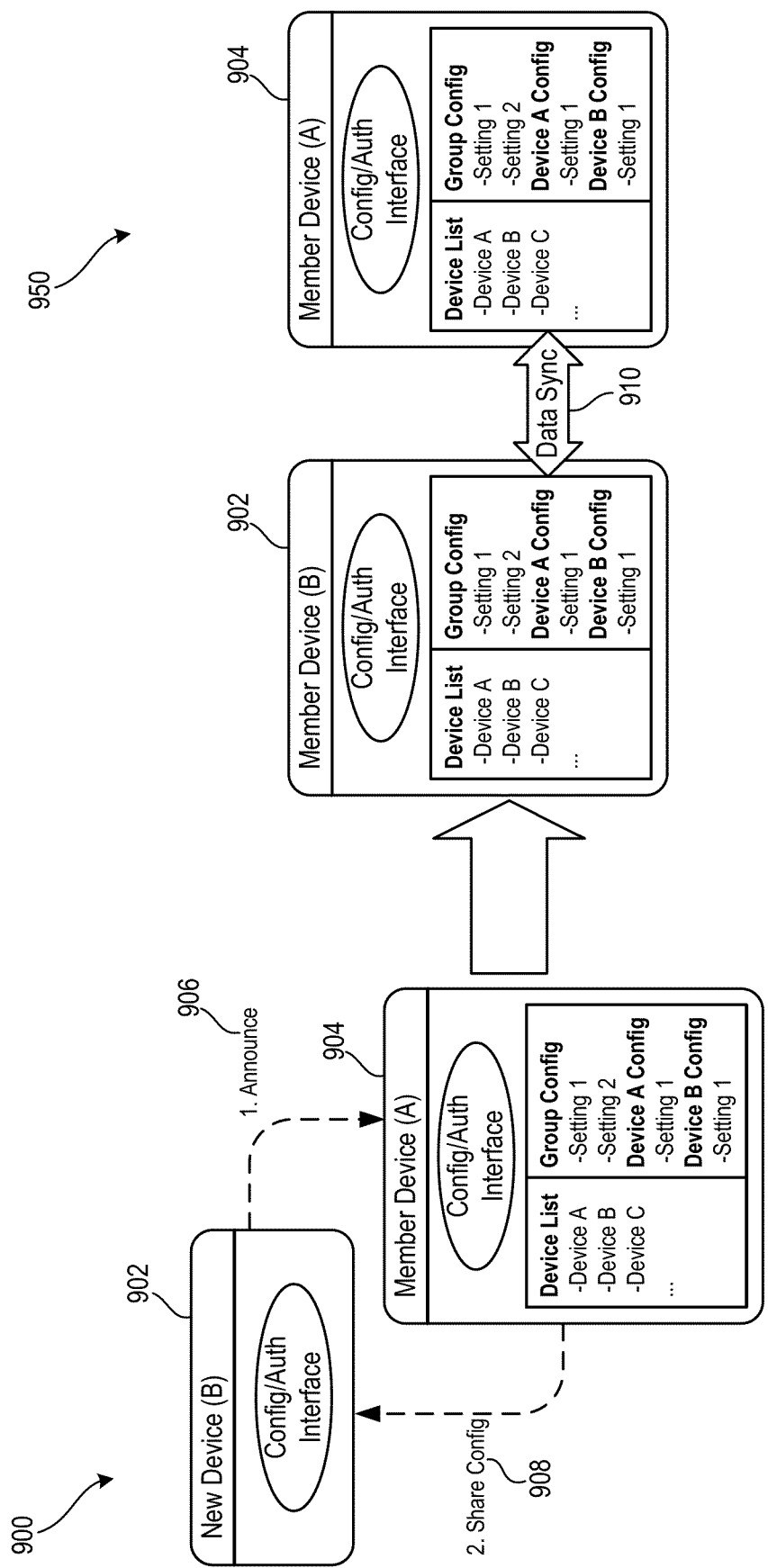
FIG. 9 is a flow diagram for discovering a new device to join a device group, according to some embodiments.

Referring to FIG. 9, a flow diagram for discovering a new device to join a device group is shown, according to an exemplary embodiment. Referring to FIG. 9, when a new, non-configured device (e.g., Device B) 902 is powered on, it announces 906 itself as an available device via any available channel or communications medium (e.g., the network channel 610) as shown in the left side 900 of FIG. 9. When one or more member devices (e.g., Device A) 904 in the device group receives the announcement 906, they check whether the new device 902 was previously authorized to the group by comparing the unique device identifier of the new device 902 against the authorized device list. If the new device 902 is already authorized, the configuration settings for the device group are shared 908 with the new device 902. The new device 902 applies the configuration settings, joins the device group, and begins communication with the other members of the device group via one of the available communications channels (e.g., the network channel 610). On the other hand, if the new device 902 was not previously authorized to the device group, its unique device identifier is added to the list of unauthorized devices, and the user may authorize the new device 902 by logging into the config/auth interface 704 as described above.

Figure 10:
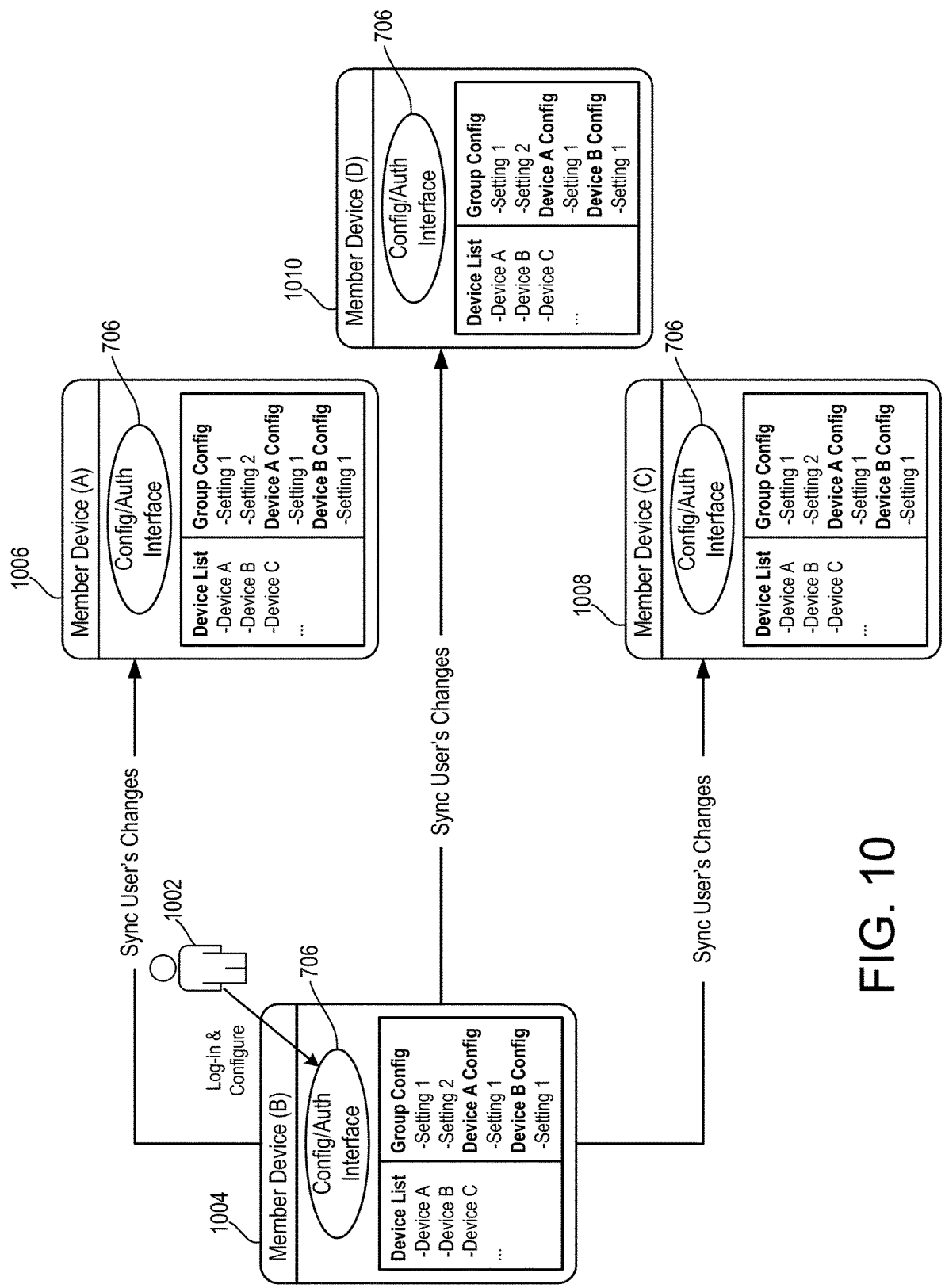
FIG. 10 is a flow diagram for synchronizing changes among member devices in a device group, according to some embodiments.

Once there are multiple members devices in the device group, the member devices can synchronize 910 the configuration settings and device lists amongst themselves (e.g., via the synchronization module 736) as needed or desired (e.g., whenever there is a change and/or periodically) so that every member device is functionally equivalent. For example, referring to FIG. 10, a flow diagram for synchronizing changes among member devices in a device group is shown, according to an exemplary embodiment. As shown in FIG. 10, a user 1002 may login to the config/auth interface 704 on any device, such as member device B 1004 as shown in FIG. 10, and change the settings or parameters. Through synchronization (e.g., via the synchronization module 736), the new settings or parameters are shared and applied to all other member devices (e.g., Device A 1006, Device C 1008, and Device D 1010) as shown in FIG. 10.

Figure 11:
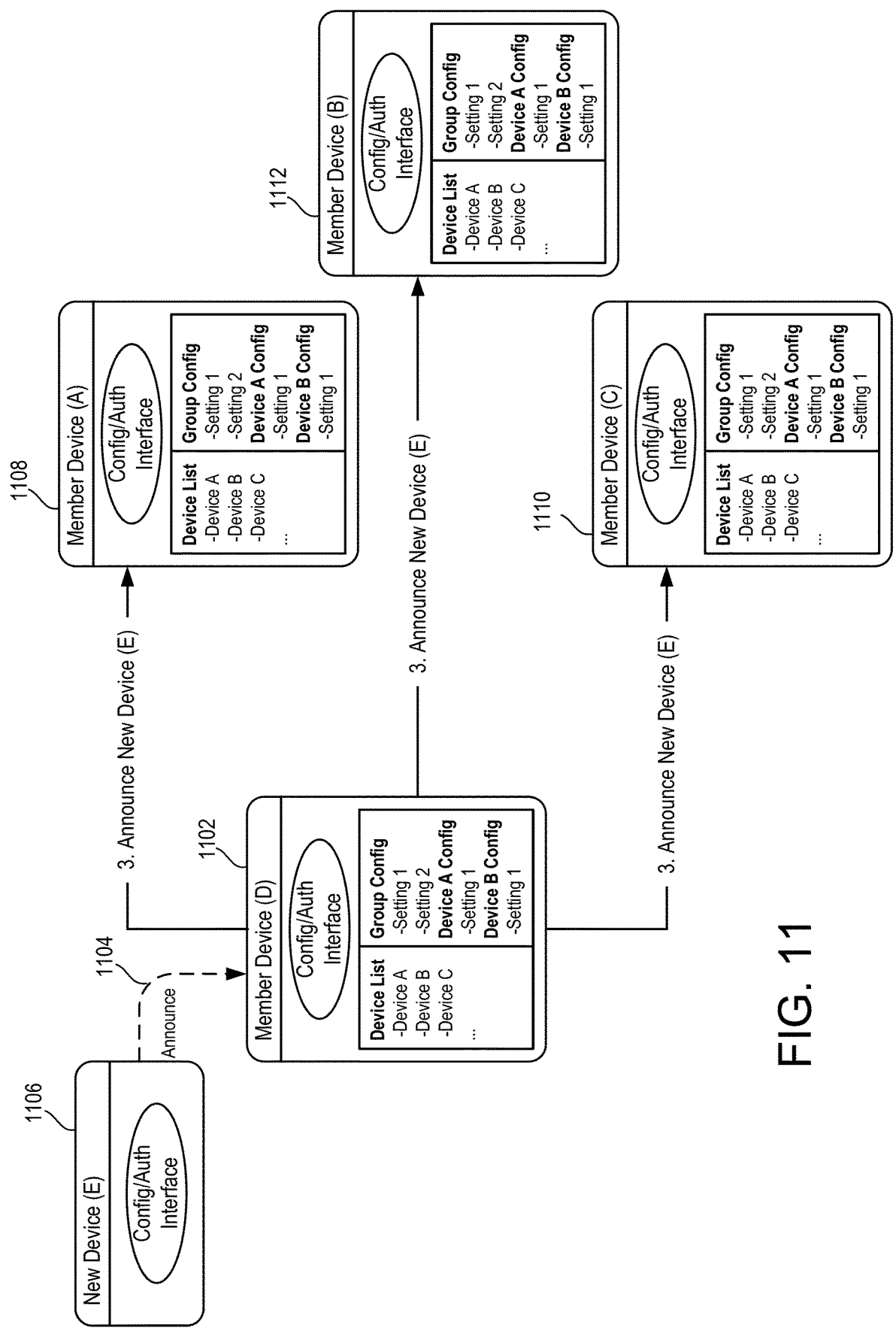
FIG. 11 is a flow diagram for synchronizing a new device announcement among member devices in a device group, according to some embodiments.

Likewise, referring to FIG. 11, a flow diagram for synchronizing a new device announcement among member devices in a device group (e.g., via the synchronization module 736) is shown, according to an exemplary embodiment. When a member device (e.g., Device D) 1102 receives the availability announcement 1104 from a new device 1106, that announcement 1104 is shared (e.g., via the synchronization module 736) with the other member devices (e.g., Device A 1108, Device C 1110, and device B 1112) as shown in FIG. 11. Therefore, a user logged into the authorization interface on any of the member devices 1104, 1108, 1110, or 1112 may choose to authorize the new device 1106, which causes a modification to the list of authorized devices and will be synchronized (e.g., via the synchronization module 736) to the other member devices as in FIG. 10.

Figure 12:
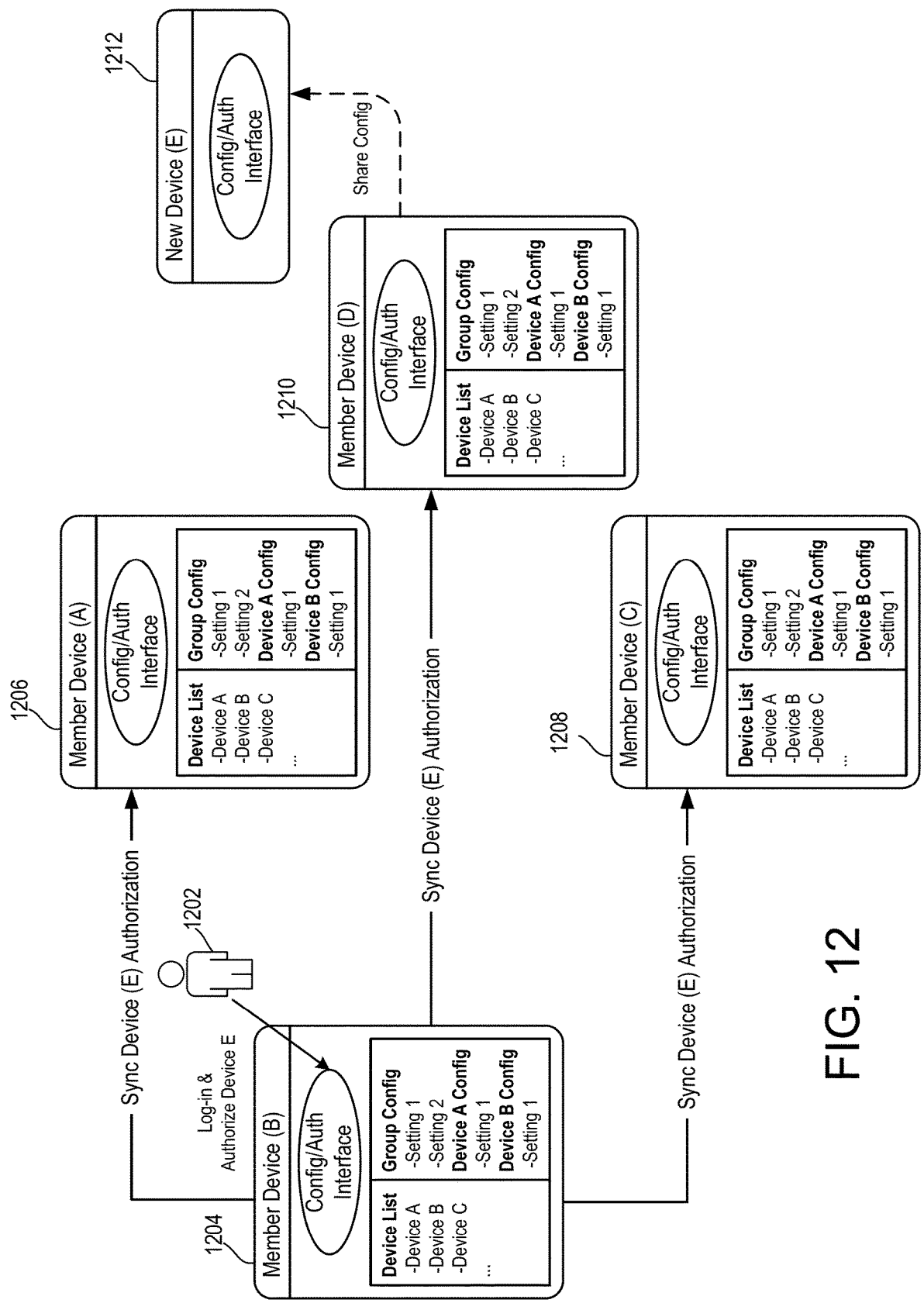
FIG. 12 is a flow diagram for synchronizing a new device authorization among devices in a device group, according to some embodiments.

FIG. 12 is a flow diagram for synchronizing a new device authorization among devices in a device group, according to an exemplary embodiment. Similar to logging in and configuring the group from any member device, a user 1202 may also log in to any member device (e.g., Device B) 1204 to authorize a new device 1212 to join the device group. FIG. 12 illustrates the user's 1202 authorization of the new device 1212 being synchronized (e.g., via the synchronization module 736) through the member devices (e.g., Device A 1206, Device B 1208, and Device D 1210) of the device group. In some embodiments, when the device that originally received the announcement (e.g., device D 1210 in FIG. 12) receives the update, it can share the configuration information with the new device (device E in FIG. 12) 1212.

Accordingly, in various embodiments, if any member device fails, the other member devices can continue operating and continue handling configuration changes and authorization of new devices since they are all functionally equivalent. A replacement for the failed device can be added to the group like any other new device and be configured as such.

In some embodiments, each of the devices in a device group may monitor the operational status (e.g., connectivity, health, and/or the like) of one or more other devices in the device group. For example, in some embodiments, each of the devices in the device group may ping one or more other devices in the device group to determine whether the one or more other devices are experiencing any connectivity issues. For example, in some embodiments, if a device pings another device in the device group, and the other device does not respond to the ping, the pinging device may determine that the non-responsive device is experiencing connectivity issues. Similarly, in some embodiments, each of the devices in the device group may self-monitor its own connectivity status by pinging other devices in the device group. For example, in some embodiments, a device may ping multiple devices in the device group, and if the device does not receive a response from any of the pinged devices in the device group, the device may assume that it itself is experiencing connectivity issues.

In some embodiments, the one or more other devices may respond to a ping with health information (e.g., heartbeat data, telemetry data, log data, notifications, and/or the like), such that a failure or potential failure of the one or more devices may be detected. For example, in some embodiments, the one or more other devices may respond to the ping with any suitable notification or data generated based on changes in a digital twin of the device, or device disconnection notification or data within a predetermined interval detected by a network configuration or cloud service. In other embodiments, each of the devices in the device group may announce its health information to one or more other devices (e.g., via one or more network channels 610) periodically or at desired (e.g., pre-configured) times. For example, in various embodiments, each of the devices in the device group may announce its health information to all of the other devices in the device group, or may announce its health information to one or more particular devices in the device group (e.g., a designated device, proxy device, parent device, master device, always on device, or the like).

In some embodiments, each of the devices in the device group may analyze the health information received from the one or more other devices to determine if the one or more other devices are failing or potentially failing. For example, in some embodiments, a device depending on configuration may report its health to one or more other devices (e.g., peer devices) in the device group with a time stamp. The one or more other devices that receives the health report may use the health report to govern whether a particular predetermined reporting period has been violated, which may indicate a possible failure of the reporting device. Similarly, in other embodiments, each of the devices in the device group may analyze its own health information to determine whether the device itself is experiencing a failure or potential failure. For example, in some embodiments, each of the devices in the device group may analyze its own health information periodically, at desired (e.g., pre-configured times), or in response to an event (e.g., an error) to determine if the device itself is experiencing a failure or potential failure.

In some embodiments, in response to detecting a failure or failing device (or potential failing device) in the device group, each of the devices in the device group may be configured to heal the failing device (or itself) in the device group. For example, in some embodiments, each of the devices in the device group may provide a reset signal to any detected failing device in the device group, such that the failing device resets itself. In some embodiments, the failing device may then optionally update itself to the latest available version (or desired version) of firmware or software, if any, such that failures caused by outdated firmware or software may be resolved. In other embodiments, each of the devices in the device group may be aware of the software or firmware versions of each of the other devices in the device group (e.g., via the device configuration settings of each device in the device group), such that if a device determines that another device in the device group (or itself) has an outdated version of software or firmware, that device may transmit an update signal to the other device that has the outdated version, such that the other device updates its software or firmware to the latest available version (or to another desired version). Similarly, in some embodiments, each of the devices in the device group may self-reset when it determines that it itself is the one having connectivity issues or experiencing a failure or potential failure, and/or may detect whether it itself has outdated firmware or software, such that the device may reset itself and/or update its own software or firmware to the latest available version (or to another desired version). Various examples of using wake-up radios to perform remote reset of devices are described in U.S. Provisional Patent Application No. 62/829,816, filed Mar. 23, 2018, and titled "A System Using Wake-Up Radios to Perform Remote Reset of Device," the entire content of which is incorporated by reference herein. However, the present disclosure is not limited thereto, and in other embodiments, each of the devices may perform a reset or self-reset using any suitable methods.

For example, in some embodiments, when a device detects a failure of another device (or of itself), the device may transmit a command to the failing device to perform a factory reset. In this case, the failing device may use an original image of its own hardware (e.g., as stored in the device config data store 740), may retrieve a factory image from a cloud service (e.g., a blob storage), and/or may communicate with another device (e.g., another device in the device group or a dedicated device) to download the factory image. In another example, in some embodiments, when a device detects a failure of another device (or of itself), the device may upload a factory image to the other device (e.g., the failed device), such that the failed device can install or otherwise download the factory image. For example, in some embodiments, the device that detects the failing device can upload an original factory image to the failing device or can upload a new (e.g., newest) factory image to the failing device, such that the failing device can replace its factory image with the uploaded factory image. Similarly, in some embodiments, if a device detects that itself is a failing device, then the device may automatically install or download a factory image (e.g., its original factory image, a factory image from another device, a factory image from a cloud service, and/or the like), such that the device can perform a self-factory reset or firmware/software update.

In various embodiments, each of the devices in the device group may act as a functionally equivalent monitory device for one or more other devices in the device group and/or for itself, such that no single device in the device group can become a single point of failure. For example, in various embodiments, the status monitoring of the devices in the device group may be redundant across all of the devices in the device group such that any device in the device group may monitor the operational status (e.g., connectivity, health, and/or the like) of any other device in the device group. In this case, in various embodiments, each of the devices in the device group may be responsible for monitoring the operational status of all of the other devices in the device group, or for monitoring a sub-set of devices (e.g., closest, neighboring, or adjacent devices) from among the devices in the device group.

For example, in some embodiments, at least one of the devices in the device group may be designated as a primary (or master) monitory device, such that the primary monitory device is responsible for monitoring the operational status of each of the other devices in the device group. In other embodiments, a plurality of devices in the device group may be designated as a primary monitory device, such that each primary monitory device is responsible for monitoring a sub-set of devices in the device group. For example, each primary monitory device may be responsible for monitoring the neighboring (or closest adjacent) devices in the device group. In any case, in some embodiments, since each of the devices are functionally equivalent, any of the devices may act as the primary monitory device for the device group (or sub-set). For example, in some embodiments, if the primary monitory device for the device group (or sub-set) fails, then any of the other devices in the device group (or sub-set) can assume the primary role for monitoring the devices in the device group or sub-set. In other examples, the primary monitoring role may be assumed based on a schedule, based on proximity (e.g., adjacent devices), based on function or capability, based on capacity or availability (e.g., bandwidth), and/or the like. In any case, since each of the devices in the device group are configured as redundant devices, any of the devices in the device group can assume the primary role as needed or desired, or each of the devices in the device group can assume the primary monitory role concurrently (or simultaneously). Accordingly, if any primary device(s) fail, the other member devices can continue operating and continue handling the monitoring role of one or more other devices in the device group, since they are all functionally equivalent. However, the present disclosure is not limited thereto, and in other embodiments, only one of the devices (or a subset of the devices) in the device group may be functionally configured as the monitoring device for the device group.

In some embodiments, once the failing device is powered back on or otherwise becomes available after the reset and/or update, the failing device may announce itself (e.g., via the one or more networks channels 610) to rejoin the device group, may synchronize data with the other devices in the device group (e.g., via the synchronization module 736), and may communicate with the other members of the device group via one or more of the available communication channels (e.g., one or more network channels 610).

Figure 13:
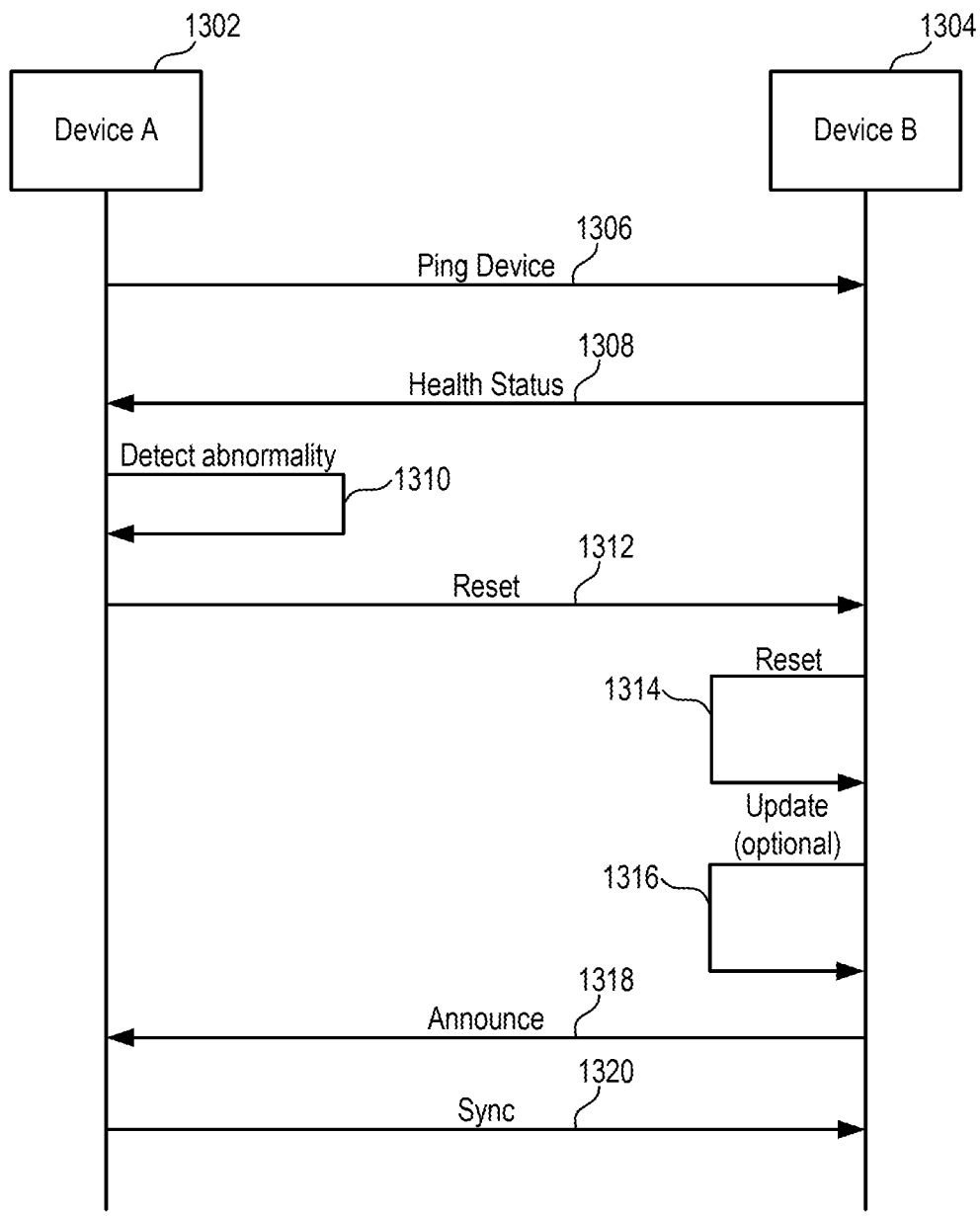
FIG. 13 is a signaling diagram for monitoring the status of a device in a device group, according to some embodiments.

FIG. 13 is a signaling diagram for monitoring the status of a device in a device group, according to some embodiments. Referring to FIG. 13, in some embodiments, each of a first device (e.g., device A) 1302 and a second device (e.g., device B) 1304 may include the same or substantially the same components and elements as those of the device 700 shown in FIG. 7, and may each be authorized members of the same device group. Accordingly, in some embodiments, each of device A 1302 and device B 1304 may be functionally equivalent devices, such that the monitory roll is redundant across each of the device A 1302 and device B 1304. While FIG. 13 shows only two devices in the device group, the present disclosure is not limited thereto, and it should be appreciated that the number of devices in the device group can include any suitable number of at least two devices.

As shown in FIG. 13, in some embodiments, the device A 1302 may ping the device B 1304 at operation 1306. In various embodiments, the device A 1302 may ping the device B 1304 periodically, at predetermined intervals, and/or in response to an event (e.g., an error event, failure to sync event, unresponsive event, and/or the like) to check the operational status (e.g., connectivity, health, and/or the like) of the device B 1304. For example, in various embodiments, the device A 1302 may transmit a status request message to the device B 1304 to check the operational status of the device B 1304. In some embodiments, if the device B 1304 does not respond to the ping from device A 1302 (e.g., within a threshold time period), the device A 1302 may assume that the device B 1304 is experiencing connection issues.

In some embodiments, if the device B 1304 does not respond to the ping from device A 1302 (e.g., within the threshold time period), then the device A 1302 may ping another device in the device group to ensure that the device A 1302 itself is not the device experiencing connection issues. For example, in some embodiments, if the device A 1302 does not receive a response from either device B 1304 or the other device in the device group (e.g., within the threshold time period), then the device A 1302 may assume that it itself is experiencing connection issues, and may initiate a self-restart or self-reset to fix the connection issue. Likewise, in some embodiments, if device B 1304 does not receive the status request message of the operation 1306 at an expected time (e.g., within an expected interval or predetermined time), the device B 1304 may attempt to ping the device A 1302 or another device within the device group to check if it itself is experiencing connection issues. In this example, if the device B 1304 does not receive a response to the ping from device A or from the other device within the device group, then the device B may assume that it itself is experiencing connection issues, and may initiate a self-restart or self-reset.

Referring back to FIG. 13, in some embodiments, the device B 1304 receives the ping from device A 1302 at operation 1306, and responds to the ping with its health information (or health status) at operation 1308. For example, in some embodiments, the device B 1304 may provide a health status response message including its health information (e.g., heartbeat data, telemetry data, log data, notifications, and/or the like) indicative of whether or not the device B 1304 is experiencing a failure or potential failure. In some embodiments, in response to receiving the health status response of device B at operation 1308, the device A 1302 may analyze the health information to determine whether the device B 1304 is experiencing a failure or potential failure at operation 1310.

In some embodiments, if the device A 1302 determines that the device B 1304 is experiencing a failure or potential failure at operation 1310, then device A 1302 transmits a reset (or restart) command to device B 1304 at operation 1312. In some embodiments, in response to receiving the reset command, the device B 1304 initiates a self-reset (or self-restart) at operation 1314. In some embodiments, the device B 1304 optionally initiates a self-update to update its software and/or firmware to the latest (or desired) available version of software and/or firmware. In some embodiments, since each of device A 1302 and device B 1304 knows the version of software of firmware for each of the devices in the device group (e.g., via the device settings in the device config data store 740), each of the devices in the device group may initiate a self-update or may transmit an update signal to the outdated device to initiate the self-update in response to determining that the outdated device has outdated software and/or firmware.

In some embodiments, once the device B 1304 restarts or otherwise becomes available after the reset and/or update, the device B 1304 announces itself at operation 1318, rejoins the device group, and syncs data with the other members of the device group at operation 1320, such that the device B 1304 can be added (or re-added) to the device group like any other new device (or authorized device) and be configured as such.

Virtual Network Channel Segregation

Figure 14:
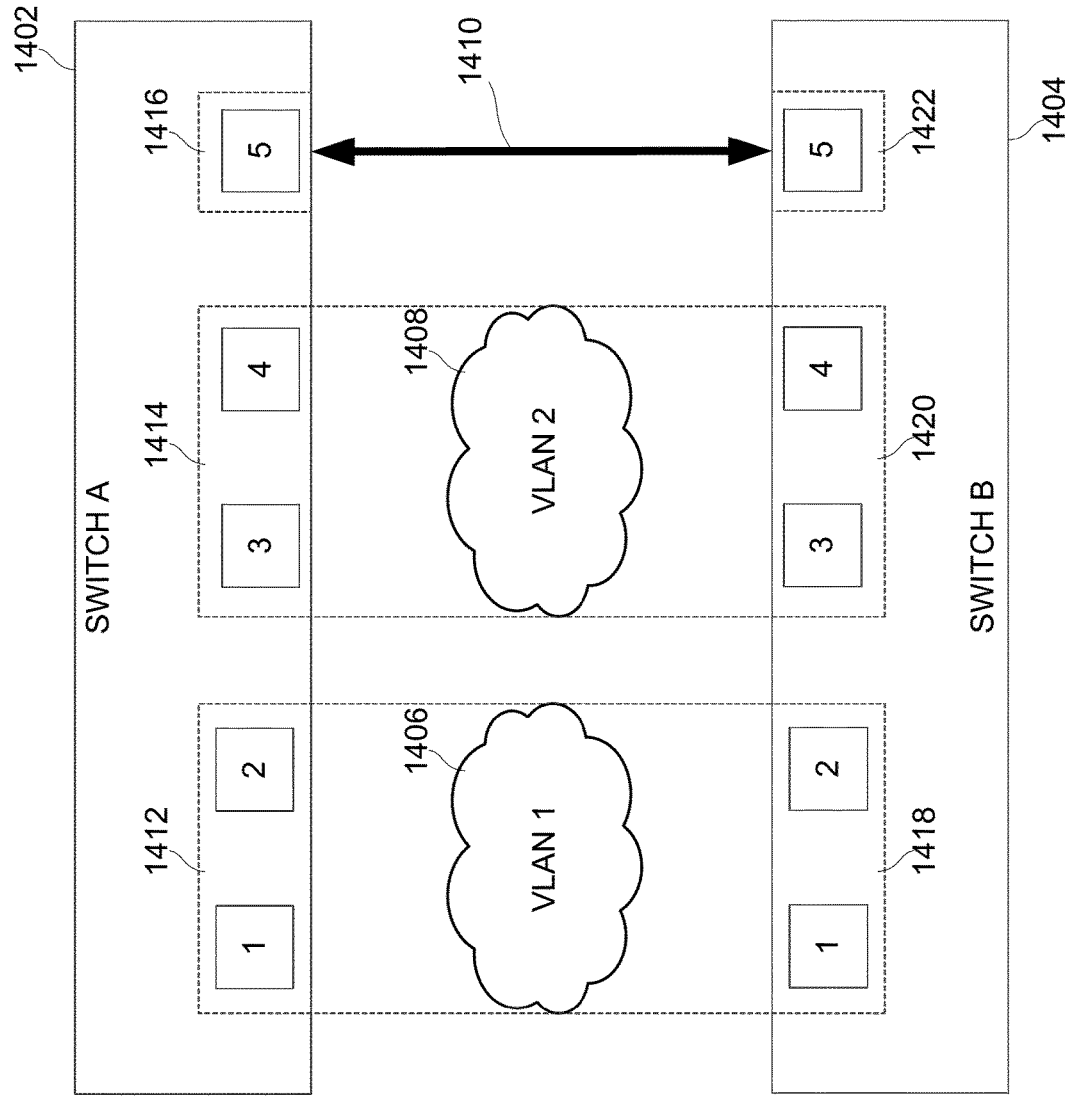
FIG. 14 is a system diagram illustrating a plurality of devices communicating via a plurality of segregated virtual network channels, according to an exemplary embodiment.

FIG. 14 is a system diagram illustrating a plurality of devices communicating via a plurality of segregated virtual network channels, according to an exemplary embodiment. Virtual networks, such as a virtual local area network (VLAN), enable the operation of a plurality of networks (e.g., local area networks (LANs)) over the same physical hardware (e.g., a switch), such that traffic or data (e.g., packets) for one virtual network channel (or a first VLAN) is segregated from traffic or data for another virtual network channel (or a second VLAN). For example, referring to FIG. 14, each of a first device (Switch A) 1402 and a second device (Switch B) 1404 is communicably connected to a plurality of virtual network channels (e.g., VLAN 1 and VLAN 2) 1406 and 1408. In some embodiments, traffic or data communicated between the first and second devices 1402 and 1404 for a first virtual network channel 1406 may be segregated from traffic or data for a second virtual network channel 1408. For example, in some embodiments, the first and second devices 1402 and 1404 may segregate communications of a first type of data (e.g., configuration and authorization data) from communications of a second type of data (e.g., general network traffic data) based on the first or second virtual network channels 1406 and 1408 used for broadcasting or otherwise transmitting the data.

In brief overview, in some embodiments, the first device 1402 and the second device 1404 may be communicably connected to each other via an interconnect 1410. In various embodiments, the interconnect may be any suitable wireless or wired network link, for example, such as Ethernet, fiber optics, wireless link, mesh link, and/or the like. In some embodiments, each of the first and second devices 1402 and 1404 may tag or otherwise assign to packets on the interconnect 1410 an appropriate identifier (e.g., VLAN identifier) for the virtual network channel associated with the packets. In some embodiments, when a device (e.g., the first device 1402 or the second device 1404) receives the packet on the interconnect 1410, the device extracts (or strips) the identifier from the packet (e.g., untags the packet) and uses the identifier to determine the appropriate destination (e.g., appropriate VLAN interface or port) to which to forward the packet.

In more detail, as shown in FIG. 14, in some embodiments, the first device 1402 includes one or more first ports (e.g., ports 1 and 2) or interface 1412 assigned for the first virtual network channel (e.g., VLAN 1) 1406, one or more second ports (e.g., ports 3 and 4) or interface 1414 assigned for the second virtual network channel (e.g., VLAN 2) 1408, and one or more third ports (e.g., port 5) or interface (e.g., interconnect interface) 1416 assigned for the interconnect 1410. The second device 1404 similarly includes one or more first ports (e.g., ports 1 and 2) or interface 1418 assigned for the first virtual network channel 1406, one or more second ports (e.g., ports 3 and 4) or interface 1420 assigned for the second virtual network channel 1408, and one or more third ports (e.g., port 5) or interface (e.g., interconnect interface) 1422 assigned for the interconnect 1410. In some embodiments, when a device from among the first and second devices 1402 and 1404 broadcasts or otherwise transmits a packet from a port assigned to a corresponding one of the first or second virtual network channels 1406 and 1408, the device forwards the packet to the other ports assigned to the corresponding one of the first or second virtual network channels 1406 and 1408. The device further tags the packet with an appropriate identifier (e.g., VLAN ID) of the corresponding one of the first or second virtual network channels 1406 and 1408, and forwards the tagged packet to its interconnect port (e.g., port 5). When the other device from among the first and second devices 1402 and 1404 receives the tagged packet at its own interconnect port (e.g., port 5), the other device untags the packet and forwards the packet to its appropriate ports for the corresponding one of the first or second virtual network channels 1406 and 1408.

For a non-limiting example, when the first device 1402 broadcasts a packet from port 2 of the VLAN 1 ports 1412 associated with the first virtual network channel 1406, the packet is forwarded to port 1 of the VLAN 1 ports 1412 associated with the first virtual network channel 1406. The first device 1402 also tags or otherwise assigns the VLAN 1 ID to the packet corresponding to the first virtual network channel 1406, and forwards the tagged packet to its interconnect port 1416 (e.g., port 5), such that the tagged packet is transmitted to the second device 1404 via the interconnect 1410. When the second device 1404 receives the tagged packet at its own interconnect port 1422 (e.g., port 5) via the interconnect 1410, the second device 1404 extracts (e.g., untags or otherwise strips) the VLAN 1 ID from the tagged packet. The second device 1404 forwards the packet to its first virtual network channel 1406 ports 1418 (e.g., its VLAN 1 ports 1 and 2) base on the identifier VLAN 1 ID, such that the packet can be identified and processed according to the type of data communicated via the first virtual network channel 1406.

In some embodiments, each of the first and second devices 1402 and 1404 may include the same or substantially the same components and elements as those of the device 700 shown in FIG. 7. In this case, in some embodiments, one or more of the virtual network channels (e.g., one of the first and second virtual network channels 1404 and 1406) may be used for communicating the configuration and authentication data for the device group as described herein, and one or more other virtual network channels (e.g., the other of the first and second virtual network channels 1404 and 1406) may be used to communicate general network data (e.g., network traffic, measurement data, control data, and/or the like, from building equipment or other devices). However, the present disclosure is not limited thereto, and in other embodiments, each of the first and second devices 1402 and 1404 may include any suitable components and elements to communicate different types of data over different ones of the virtual network channels. For example, in some embodiments, the first virtual network channel 1404 may be used to communicate a first type of building management data (e.g., measured data) and the second virtual network channel 1404 may be used to communicate a second type of building management data (e.g., user defined data or control data, such as a temperature setpoint).

While FIG. 14 shows that each of the first and second devices 1402 and 1404 are embodied as a switch, the present disclosure is not limited thereto, and in various embodiments, each of the first and second devices 1402 and 1404 may be embodied as or include any suitable device, for example, such as gateway devices (e.g., the gateway 104 in FIG. 1), access point devices, modems, routers, any suitable wireless mesh network devices, BMS devices or other building equipment or devices (e.g., intelligent light fixtures, VAV units, or the like), IoT devices, a swarm of robots, or the like.

Figure 15:
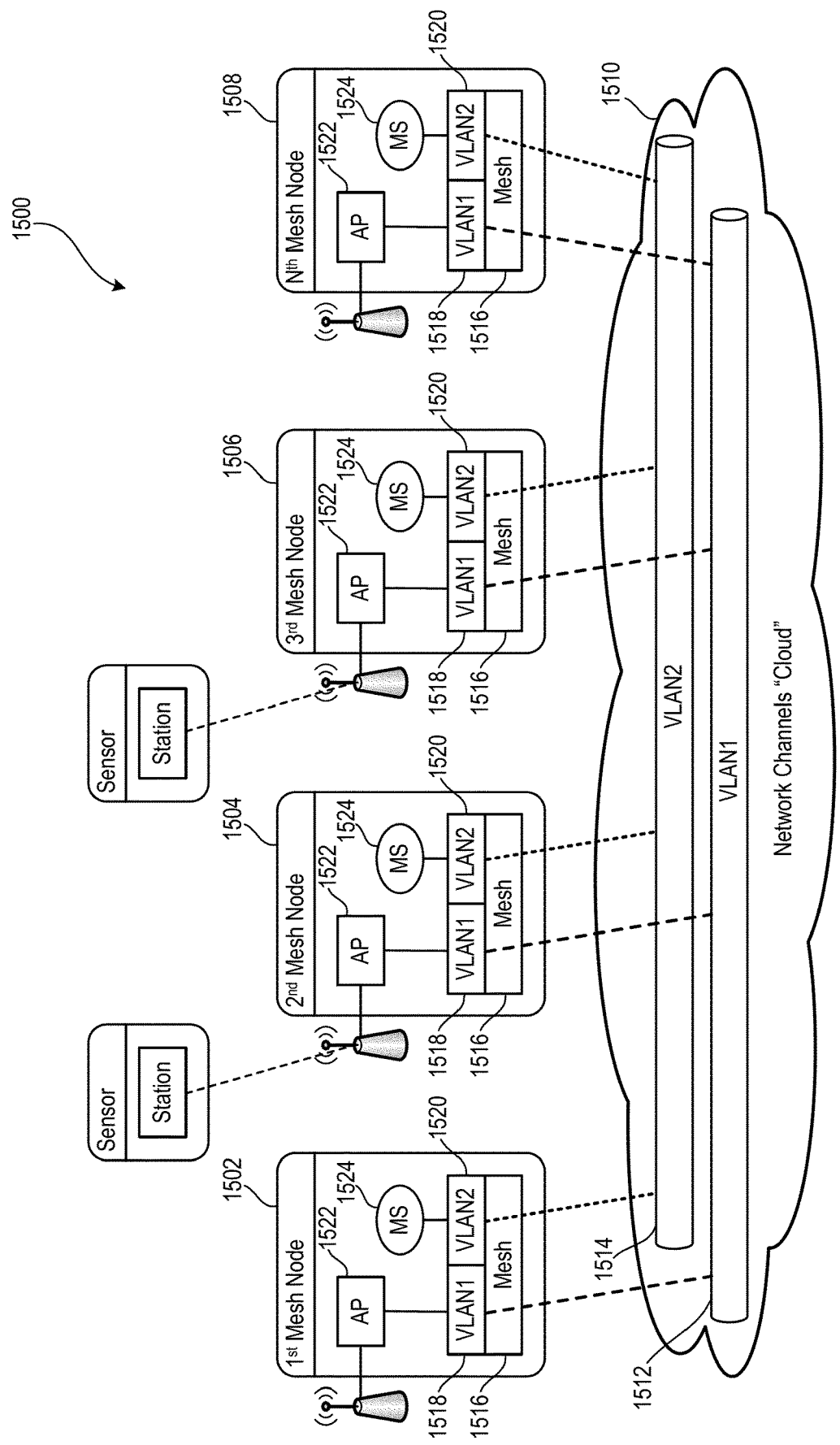
FIG. 15 is an example system diagram of a mesh network 1500 utilizing a plurality of segregated virtual network channels to communicate data among nodes, according to an exemplary embodiment.

FIG. 15 is an example system diagram of a mesh network 1500 utilizing a plurality of segregated virtual network channels to communicate data among nodes, according to an exemplary embodiment. As shown in FIG. 15, in some embodiments, the mesh network 1500 may include a plurality of nodes 1502, 1504, 1506, and 1508, each configured to communicate via one or more available network channels 1510. For example, in some embodiments, the mesh network 1500 may include a first mesh node 1502, a second mesh node 1504, a third mesh node 1506, and an Nth mesh node 1508, where N is a natural number greater than 1. It should be appreciated that the present disclosure is not limited to the number of nodes shown in FIG. 15, and that the mesh network 1500 can include any suitable number of at least two nodes.

In some embodiments, the network channels 1510 may include a plurality of virtual network channels 1512 and 1514. For example, in some embodiments, the network channels 1510 may include a first virtual network channel (VLAN 1) 1512 and a second virtual network channel (VLAN 2) 1514. However, the present disclosure is not limited thereto, and it should be appreciated that the network channels 1510 may include any suitable number of at least one network channel.

In various embodiments, each of the nodes (e.g., 1502, 1504, 1506, and 1508) in the mesh network 1500 may be embodied as any suitable device described herein. For example, in some embodiments, each of the nodes in the mesh network 1500 may be embodied as gateway devices (e.g., the gateway 104 in FIG. 1), access point devices, modems, routers, or any suitable wireless mesh network devices. However, the present disclosure is not limited thereto, and in other embodiments, each of the nodes in the mesh network 1500 may be embodied as BMS devices or other building equipment or devices (e.g., intelligent light fixtures, VAV units, or the like), IoT devices, a swarm of robots, or the like.

In some embodiments, each of the nodes (e.g., 1502, 1504, 1506, and 1508) in the mesh network 1500 may communicate data (e.g., data packets, messages, and/or the like) via each of the first and second virtual network channels 1512 and 1514. In some embodiments, each of the nodes (e.g., 1502, 1504, 1506, and 1508) may include a first communication interface (e.g., VLAN1) 1518 and a second communication interface (e.g., VLAN2) 1520. In some embodiments, the first communication interface 1518 may correspond to one or more first ports of each of the nodes (e.g., 1502, 1504, 1506, and 1508) and the second communication interface 1520 may correspond to one or more second ports of each of the nodes (e.g., 1502, 1504, 1506, and 1508) that are similar to or the same as the first (e.g., 1412 or 1418) and second (e.g., 1414 or 1420) ports of any of the devices 1402 and 1404 described with reference to FIG. 14. For example, in some embodiments, the first communication interface 1518 of each of the nodes (e.g., 1502, 1504, 1506, and 1508) may include one or more first ports assigned for the first virtual network channel 1512, and the second communication interface 1520 of each of the nodes (e.g., 1502, 1504, 1506, and 1508) may include one or more second ports assigned for the second virtual network channel 1514.

In some embodiments, each of the nodes (e.g., 1502, 1504, 1506, and 1508) in the mesh network 1500 may include a third communications interface or an interconnect interface (e.g., MESH) 1516 to exchange data (e.g., data packets, messages, and/or the like) among the nodes (e.g., 1502, 1504, 1506, and 1508). In some embodiments, the interconnect interface 1516 of each of the nodes (e.g., 1502, 1504, 1506, and 1508) may correspond to the one or more third ports of each of the nodes (e.g., 1502, 1504, 1506, and 1508) that are similar to or the same as the third ports (e.g., 1416 or 1422) of any of the devices 1402 and 1404 described with reference to FIG. 14. For example, in some embodiments, the interconnect interface 1516 of each of the nodes (e.g., 1502, 1504, 1506, and 1508) may include one or more third ports assigned for the interconnect between the nodes.

In some embodiments, each of the nodes (e.g., 1502, 1504, 1506, and 1508) may segregate a first type of data from a second type of data by communicating the data via the first virtual network channel 1512 or the second virtual network channel (VLAN 2) 1514 depending on the type of the data. For example, in some embodiments, when a node broadcasts or otherwise transmits a packet from one of its first or second communication interfaces 1518 and 1520, the node tags or otherwise assigns an identifier of a corresponding one of the first or second virtual network channels 1512 and 1514 assigned to the corresponding first or second communication interface 1518 or 1520. The node then forwards the tagged packet to its interconnect interface 1516, such that the tagged packet is transmitted to the other nodes over the interconnect. The other nodes receive the tagged packet, and extract the identifier from the tagged packet. The other nodes then forwards the packet to their appropriate first or second communication interface 1518 or 1520 based on the identifier. Accordingly, packets communicated over the first virtual network channel 1512 may be segregated from packets communicated over the second virtual network channel 1514.

For example, as shown in FIG. 15, in some embodiments, each of the nodes (e.g., 1502, 1504, 1506, and 1508) may include an access point (AP) 1522 connected to its corresponding first communication interface 1518, and a management service (MS) 1524 connected to its corresponding second communication interface 1520. The access point 1522 may communicate data (e.g., wirelessly or wired through Ethernet, USB, and/or the like) with one or more devices (e.g., BMS devices, BMS equipment, sensors, IoT devices, and/or the like) external to the mesh network 1500, such that data communicated over the first virtual network channel 1512 corresponds to external data (e.g., general building management data or general network traffic data). The management service 1524 may communicate internal data (e.g., configuration and authorization data) over the second virtual network channel 1514 to manage the nodes and devices of the mesh network 1500.

For example, in some embodiments, each of the nodes (e.g., 1502, 1504, 1506, and 1508) may include the same or substantially the same components and elements as those of the device 700 shown in FIG. 7, such that the management service 1524 of each of the nodes (e.g., 1502, 1504, 1506, and 1508) is similar to (or includes) the configuration module 732, the authorization module 734, and the synchronization module 736 shown in FIG. 7. In this case, the second virtual network channel 1514 may be used to communicate configuration, authorization, and synchronization data among the nodes as discussed herein, while the first virtual network channel 1514 may be used to communicate general building management data (e.g., data from building equipment, building devices, sensors, controllers, and/or the like). For example, in some embodiments, when a new node becomes authorized to join the mesh network 1500, the new node may extend the first and second virtual network channels 1512 and 1514 like the other nodes of the mesh network 1500 (e.g., connect its access point 1522 to VLAN 1 1512 and its management service 1524 to VLAN 2 1514), and may synchronize data with the other nodes of the mesh network 1500, such that it is configured the same as any other node in the mesh network 1500. However, the present disclosure is not limited thereto, and in other embodiments, each of the nodes (e.g., 1502, 1504, 1506, and 1508) may have different configurations from each other, may include one or more masters or primary devices to manage the configuration and authorization of the device group, and/or may include any suitable components and elements to communicate different types of data (e.g., different types of building management data) over different ones of the network channels 1510.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for distributed device management, comprising:
   a group of devices, each device in the group of devices configured to communicate with one or more other devices in the group of devices over one or more network channels, and each device in the group of devices comprising:
      an authorization interface configured to provide access to the device by a user and provide a user interface for the user to add a new device to the group of devices;
      a channel interface configured to facilitate communication between the device and the one or more other devices in the group of devices over the one or more network channels; and
      a processing circuit configured to, without requiring input from a dedicated supervisory device:
         manage one or more devices in the group of devices;
         authorize the new device to join the group of devices based on user input provided via the authorization interface; and
         synchronize data with the new device and with one or more devices in the group of devices by transmitting the data via the channel interface over the one or more network channels, wherein each device in the group of devices stores a set of configuration data comprising device-specific configuration data for the device and device-specific configuration data for each of the one or more other devices in the group of devices.

2. The system of claim 1, wherein each device in the group of devices comprises one or more data stores configured to store configuration data for one or more devices in the group of devices.

3. The system of claim 2, wherein the one or more data stores of each device in the group of devices are further configured to store an authorized device list for the group of devices.

4. The system of claim 2, wherein the one or more data stores of each device in the group of devices are further configured to store diagnostic data for one or more devices in the group of devices.

5. The system of claim 2, wherein each device in the group of devices is configured to:
detect a software or firmware version of one or more devices in the group of devices stored in the one or more data stores; and
transmit a command to the one or more devices to automatically update to a different firmware or software version in response to detecting an outdated version of the firmware or software.

6. The system of claim 1, wherein each device in the group of devices is configured to provide the user interface, wherein the user interface is configured to enable a user to manage the group of devices from any device in the group of devices.

7. The system of claim 1, wherein each device in the group of devices is configured to monitor one or more devices in the group of devices.

8. The system of claim 7, wherein each device in the group of devices is configured to monitor a connection status of the one or more devices in the group of devices.

9. The system of claim 7, wherein each device in the group of devices is configured to monitor a health status of the one or more devices in the group of devices.

10. The system of claim 7, wherein each device in the group of devices is configured to reset the one or more devices in the group of devices in response to detecting an error state of the one or more devices.

11. A system for distributed device management, comprising:
a group of devices, each device in the group of devices configured to communicate with one or more other devices in the group of devices over one or more network channels, and each device in the group of devices comprising:
an authorization interface configured to provide access to the device by a user and provide a user interface for the user to add a new device to the group of devices;
a channel interface configured to facilitate communication between the device and the one or more other devices in the group of devices over the one or more network channels; and
a processing circuit configured to, without requiring input from a dedicated supervisory device:
authorize the new device to join the group of devices based on user input provided via the authorization interface; and
synchronize data with one or more devices in the group of devices by transmitting the data via the channel interface over the one or more network channels, wherein synchronizing the data comprises synchronizing across the group of devices a set of configuration data comprising device-specific configuration data for each device in the group of devices,
each device in the group of devices further comprising one or more data stores configured to store configuration data for one or more devices in the group of devices.

12. The system of claim 11, wherein the one or more data stores of each device in the group of devices are further configured to store an authorized device list for the group of devices.

13. The system of claim 11, wherein each device in the group of devices is configured to provide the user interface, wherein the user interface is configured to enable a user to manage the group of devices from any device in the group of devices.

14. The system of claim 11, wherein each device in the group of devices is configured to monitor one or more devices in the group of devices.

15. The system of claim 14, wherein each device in the group of devices is configured to monitor a connection status of the one or more devices in the group of devices.

16. The system of claim 14, wherein each device in the group of devices is configured to monitor a health status of the one or more devices in the group of devices.

17. The system of claim 14, wherein each device in the group of devices is configured to reset the one or more devices in the group of devices in response to detecting an error state of the one or more devices.

18. A system for distributed device management, comprising: a group of devices, each device in the group of devices configured to communicate with one or more other devices in the group of devices over one or more network channels, and each device in the group of devices comprising:
a channel interface configured to transmit an announce message to the one or more network channels when the device is powered on or becomes available;
authorization interface configured to provide a user interface comprising a search or scan function for a user to discover a new device to add to the group of devices; and
a processing circuit configured to, without requiring input from a dedicated supervisory device:
monitor one or more devices in the group of devices;
authorize the new device to join the group of devices based on user input provided via the authorization interface; and
synchronize data with one or more devices in the group of devices by transmitting the data via the channel interface over the one or more network channels, wherein synchronizing the data comprises synchronizing across the group of devices a set of configuration data comprising device-specific configuration data for each device in the group of devices.

19. The system of claim 18, wherein each device in the group of devices is configured to monitor a connection status of one or more devices in the group of devices.

20. The system of claim 18, wherein each device in the group of devices is configured to monitor a health status of one or more devices in the group of devices.

21. The system of claim 18, wherein each device in the group of devices is configured to:
detect a software or firmware version of one or more other devices in the group of devices; and
transmit a command to the one or more other devices to automatically update to a different firmware or software version in response to detecting an outdated version of the firmware or software.

22. The system of claim 18, wherein to cause the other device to reset, the processing circuit is configured to:
  transmit a command to the other device to perform a self-factory reset,
  wherein in response to receiving the command, the other device is configured to at least one of:
    install an original factory image from its own hardware;
    retrieve a factory image from a cloud service; or
    communicate with another device from among the group of devices to download a factory image.

23. The system of claim 18, wherein to cause the other device to reset, the processing circuit is configured to:
  upload a factory image to the other device,
  wherein the other device is configured to install the uploaded factory image.

* * * * *